US010097556B2

(12) United States Patent
Boval et al.

(10) Patent No.: US 10,097,556 B2
(45) Date of Patent: Oct. 9, 2018

(54) METHODS AND SYSTEMS FOR MAINTAINING REACHABILITY OF A MESSAGING APPLICATION

(71) Applicant: Facebook, Inc., Menlo Park, CA (US)

(72) Inventors: Louis Benoit Philippe Boval, San Francisco, CA (US); Kunal Nikhil Modi, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 235 days.

(21) Appl. No.: 15/191,874

(22) Filed: Jun. 24, 2016

(65) Prior Publication Data

US 2017/0374075 A1 Dec. 28, 2017

(51) Int. Cl.
*H04L 29/06* (2006.01)
*H04L 12/58* (2006.01)

(52) U.S. Cl.
CPC ............ *H04L 63/102* (2013.01); *H04L 51/04* (2013.01)

(58) Field of Classification Search
CPC ..... H04L 67/025; H04L 63/102; H04L 57/04; H04L 51/32; G06Q 10/10
See application file for complete search history.

(56) References Cited

U.S. PATENT DOCUMENTS

| | | | | |
|---|---|---|---|---|
| 8,990,580 B2 * | 3/2015 | Matsuoka | ............ | H04L 9/3231 340/5.83 |
| 9,245,103 B2 * | 1/2016 | Burch | .................. | G06F 21/335 |
| 2007/0106739 A1 * | 5/2007 | Clark | ..................... | H04L 51/24 709/206 |
| 2015/0310444 A1 * | 10/2015 | Chen | ................. | G06Q 20/4016 705/44 |
| 2016/0005003 A1 * | 1/2016 | Norris | ................... | G06Q 10/10 705/7.19 |

* cited by examiner

*Primary Examiner* — Benjamin E Lanier
*Assistant Examiner* — Paul E Callahan

(57) ABSTRACT

Exemplary embodiments relate to techniques for the atomic switching of user accounts for a messaging client, in order to maintain constant network availability of the messaging client. The messaging client may allow the registering of multiple messaging accounts and switching between them. Switching may include validating a selecting account, logging out the currently-active account if validation is successful, and logging in the selected account. If validation or logging-in fails, the messaging client remains logged-in to, or returns to, the previously-active account. A limited token may be maintained for inactive accounts and may allow for the retrieval of information such as whether inactive accounts have unread messages, and if so how many, without allowing further access. The messaging client may therefore periodically poll the messaging system (or vice versa) and display notifications for inactive accounts, and the inactive accounts may still be listed as available via the messaging system.

17 Claims, 24 Drawing Sheets

Client Messaging Logic
600

Centralized Messaging System
800
Client
100-1
Input
Device
802
Output
Device
808
Memory
104
Input
804
Messaging
Client
106
Output
806
Network Interface
810
Client
100-2
Client
100-3
Network
812
Social Networking
Server
130
Network
Interface
132
Social
Networking
Graph
134
Messaging Server
120
Network
Interface
122
Server-Side
Messaging Logic
650
Messaging
Preferences
126

Distributed Messaging System
850
Client
100-1
Input Device
802
Output Device
808
Memory
104
Input
804
Messaging Client
106
Output
806
Network Interface
810
Client
100-2
Client
100-3
Network
812
Social Networking Server
130
Network Interface
132
Social Networking Graph
134
Messaging Server
120
Network Interface
122
Messaging Logic
124
Messaging Preferences
126
Accessibility Server
820
Server-Side Messaging Logic
650

METHODS AND SYSTEMS FOR MAINTAINING REACHABILITY OF A MESSAGING APPLICATION

BACKGROUND

Client devices may provide messaging services using a messaging application. It is often desirable that the messaging application always be reachable by a messaging server (e.g., for purposes of network health and availability). To ensure network reachability, some messaging applications prevent user accounts from logging out of the messaging application. However, in some cases a client device may be shared between multiple users (e.g., when a family or group of coworkers shares a common device). Preventing users from logging out of a messaging application may make it difficult for multiple users to use the same device.

SUMMARY

Exemplary embodiments relate to techniques for the atomic switching of user accounts for a messaging client. The messaging client may allow multiple messaging accounts to be registered and may switch between them in a manner that ensures continual network accessibility of the messaging client by a messaging server. Switching accounts may include the operations of validating a selecting account, logging out the currently-active account if validation is successful, then logging in the selected account. If validation or logging-in fails, the messaging client may remain logged-in to, or may return to, the previously-active account.

BRIEF DESCRIPTION OF THE DRAWINGS

Certain illustrative aspects are described in connection with the annexed drawings. These aspects are indicative of the various ways in which the principles disclosed can be practiced and all aspects and equivalents thereof are intended to be within the scope of the claimed subject matter. Other advantages and novel features will be apparent from the following detailed description when considered in conjunction with the drawings.

DETAILED DESCRIPTION

Figure 1A:
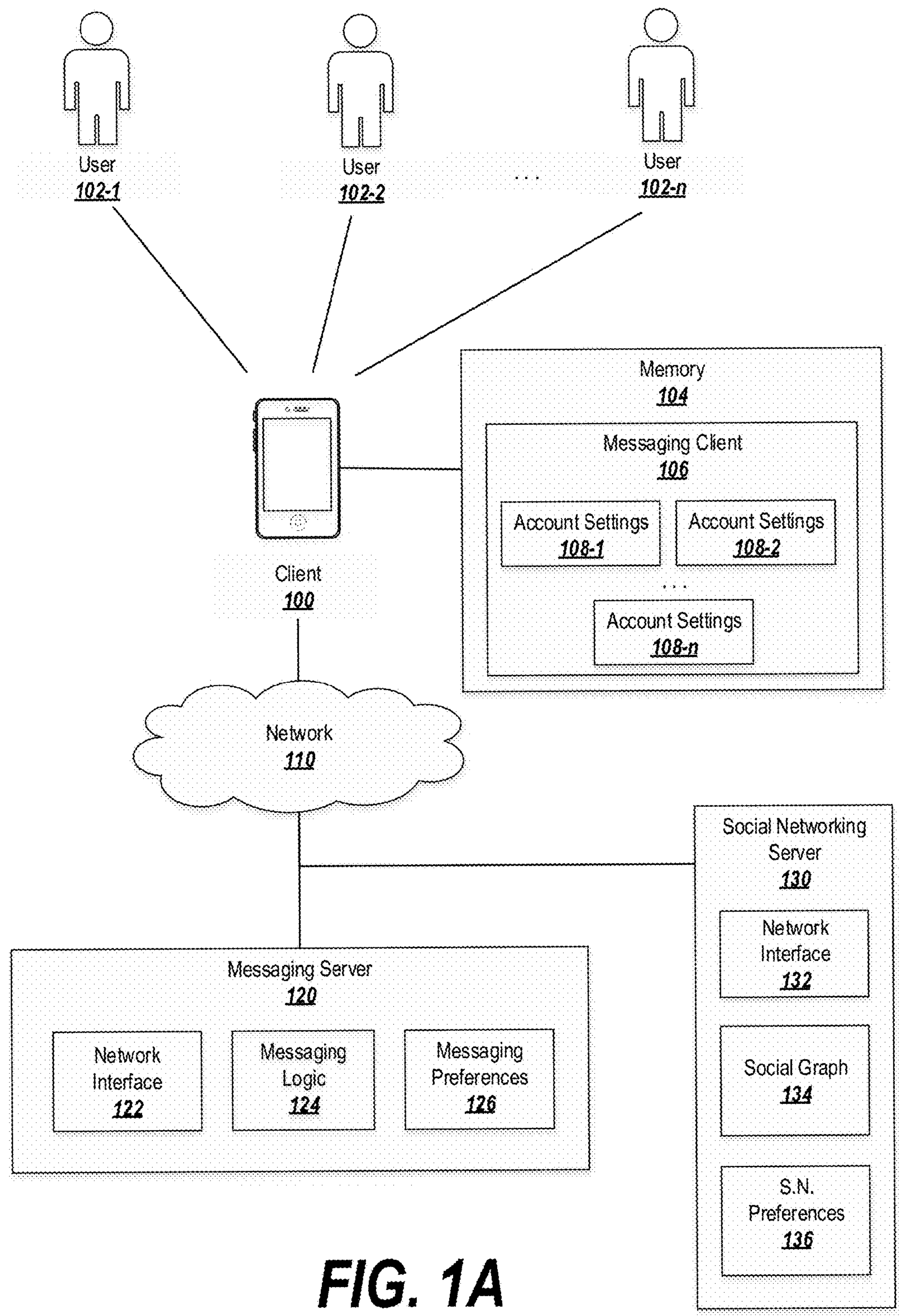
FIG. 1A depicts an exemplary system for connecting a client to a messaging service and/or a social networking service.

Exemplary embodiments described herein pertain to improvements in messaging and communications, and in particular to techniques for the atomic switching of user accounts for a messaging client to maintain constant network availability of the messaging client.

It may be desirable for a messaging client to be constantly accessible to a messaging server over a network. Constant accessibility may allow for improved network health by, for example, ensuring that a message received by the messaging server can always be directed to a messaging client. Furthermore, constant accessibility increases user confidence in the messaging service by reassuring users that if they send a message to a target user, then the message will be received at the messaging application of the target user and there will at least be an attempt to notify the target user of the message. This confidence in the reachability of a target user's messaging application may increase participation rates in the messaging service.

Typically, a messaging application is only reachable when a user account is actively logged in to the application. The messaging service may register a user account to a particular device or messaging application, and traffic may be directed to the user account. Thus, if no user account is logged into the messaging application, it may be difficult or impossible to direct traffic to the messaging application.

Similarly, it is also often desirable for a user account to be constantly accessible on some messaging application. This ensures that there is always at least an attempt to notify the user when the user has received a message, which increases confidence in the messaging service.

Therefore, one possible solution for ensuring constant accessibility is to prevent users from logging out of a messaging application. Once a user account is logged into a client device, the user account may be registered to the client device by the messaging service, and may only be changed to a different client device (e.g., by logging into the account on the new device, at which point the account may be switched from the first device to the second device, or maintained on both devices).

However, this solution may be problematic when a single device is associated with more than one user account. For example, a family may share a common mobile device, such as a tablet, e-reader, or phone, and each member of the family may have a different account with the messaging service. If the messaging service does not allow the messaging application to log off one user, then a second user may not be able to use the messaging application.

On the other hand, if the messaging service allows a first user to be logged off in anticipation of a second user being logged on, then there may be a period of time in which the messaging application is unreachable (between the log-off operation and the log-in operation). Furthermore, logging off the first user without logging the first user into another messaging application may make the first user unreachable from the messaging service.

Another problem that may arise is that the messaging application may be associated with a social networking application (e.g., a social networking service may provide messaging services through the messaging application). If one user logs into the social networking application, but a second user logs into the messaging application, then it may not be possible for the first user to receive messages from their contacts in the social network. If the messaging application disallows logouts, then the first user cannot log in to receive their messages. If the messaging application allows the second user to be logged out so that the first user can be logged in, there may be a period in which the messaging application (as well as the second user account) is inaccessible.

According to exemplary embodiments described herein, a messaging client disallows logging out to a state without any active account. Instead, the messaging client may allow the registering of multiple messaging accounts and switching between them. The process of switching accounts may involve validating a selected account, logging out the currently-active account if validation is successful, and logging in the selected account. If validation or logging-in fails, the messaging client remains logged in to, or returns to, the previously-active account.

A limited token may be maintained for inactive accounts. The limited token may authorize retrieval of information relating to the inactive accounts, such as whether the inactive accounts have unread messages, and if so how many. The limited token may prohibit other types of access, such as the retrieval and reading of message content. To retrieve inactive user notifications, the messaging client may periodically poll the messaging system and display notifications for inactive accounts. The inactive accounts may still be listed as available via the messaging system. Such polling may also be prompted by the messaging system using push techniques.

Account switching may require that the user desiring to log in as the active account provide the password for their messaging account. In some embodiments, the messaging application may store the user's password, if password storage is authorized, or the full password may be replaced with a user-settable PIN on the client device for which the user account is registered.

In some cases, a messaging account may be device-specific (such as when the messaging account is registered to the phone number of the current device, rather than a user ID that can be moved from device to device). Exemplary embodiments may allow for device-specific messaging accounts to be expanded to allow for multiple users by adding passwords or PIN to the messaging accounts.

In some embodiments, if a user is currently logged in to a social networking application associated with the messaging application, the user's credentials from the social networking application may be passed to messaging application without requiring the user to re-authenticate themselves.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through **122-*a* may include components 122-1, 122-2, 122-3, 122-4, and 122-5**. The embodiments are not limited in this context.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in connection with any type of network in which users interact. Exemplary embodiments are particularly useful in the context of a social network and/or a messaging system. An overview of an exemplary social network and messaging system is provided in the next section.

System Overview

Various embodiments are generally directed to techniques for maintaining connectivity to a messaging application while allowing for the active account on the messaging application to be changed.

FIG. 1A depicts an example of a system in which one or more users 102 interact with a messaging system and/or a social networking system using a client 100. The client 100 may be a mobile device, such as a phone, a tablet computer, or a mobile computer, or may be another type of computing device, such as a desktop computer or workstation.

The client 100 may include a memory 104 supporting a messaging client 106 that provides messaging services to the one or more users 102. The messaging services may include the ability to send and/or receive messages using the messaging client 106. One or more of the users 102 of the client 100 may be associated with account settings 108 defining configuration options and/or preferences for the users 102 with respect to the messaging service. The account settings 108 may include stored login credentials, including user names, passwords, and/or pin characters, for the users 102, if the users 102 authorize the messaging client 106 to store their login credentials.

The messaging client 106 may be associated with and/or may interact with a social networking application that provides social networking services.

The client 100 may use a network 110, such as the Internet, to access a messaging server 120 that provides a messaging service and/or to access a social networking server 130 that provides a social networking service.

The messaging server 120 may include a network interface 122 for receiving information from the network 110. The network interface 122 may forward the information to messaging logic 124, which may process the information in view of a user's messaging preferences 126 in order to transmit messages or conversations between two or more users.

The social networking server 130 may also include a network interface 132 for receiving information from the network 110. The information may be used by the social networking server 130 in order to update or maintain a social graph 134 in view of different users' social networking preferences 136. The social networking server 130 may also include functionality to present the information to users of a social network, such as through messages, posts, etc.

Figure 1B:
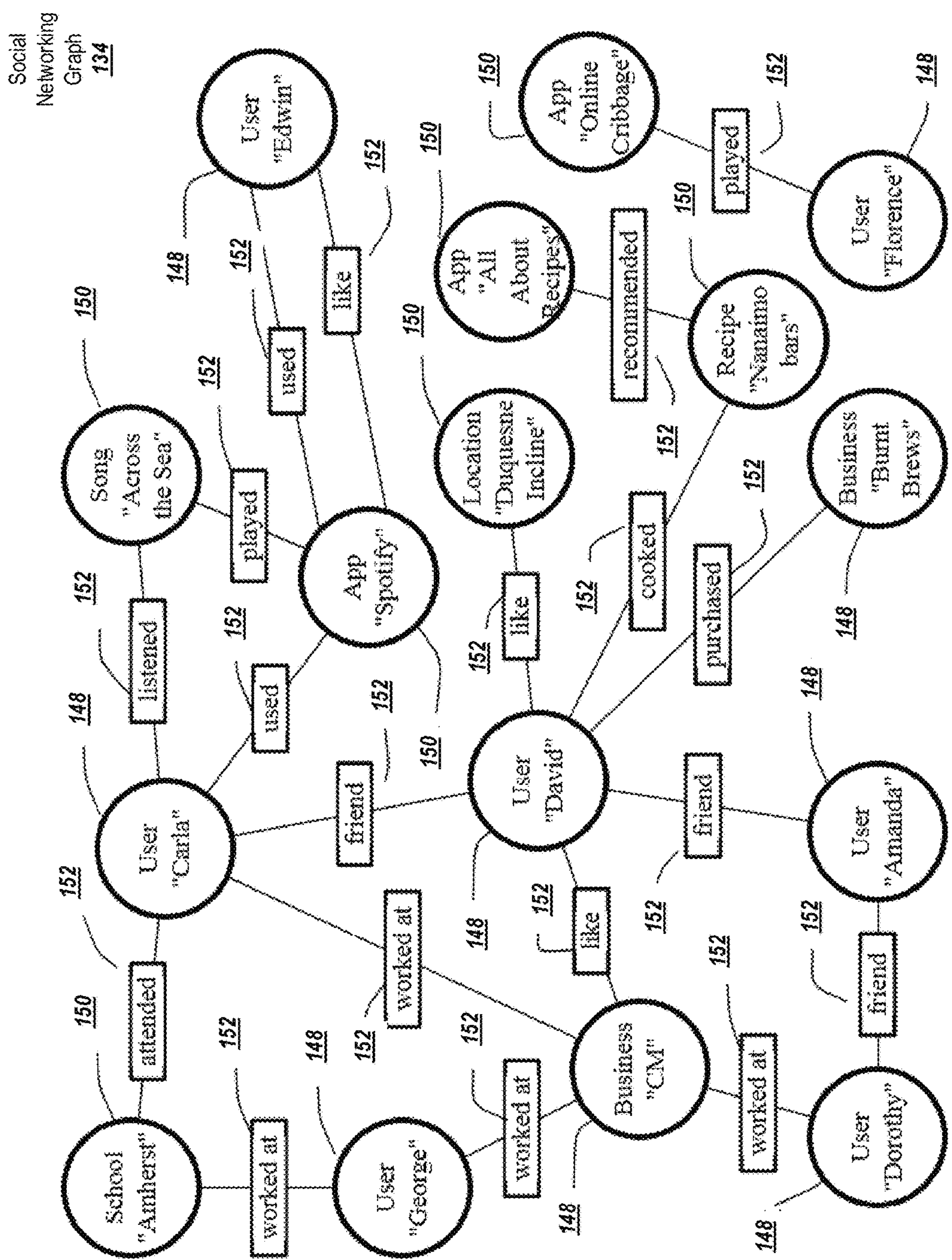
FIG. 1B depicts an exemplary social networking graph.

The social graph 134 may define relationships between entities in the social network. FIG. 1B illustrates an example of a social graph 134 in more detail. In exemplary embodiments, a social networking service may store one or more social graphs 134 in one or more data stores as a social graph data structure via the social networking service.

The social graph 134 may include multiple nodes, such as user nodes 148 and concept nodes 150. The social graph 134 may furthermore include edges 152 connecting the nodes. The nodes and edges of social graph 134 may be stored as data objects, for example, in a data store (such as a social-graph database). Such a data store may include one or more searchable or queryable indexes of nodes or edges of social graph 134.

The social graph 134 may be accessed by a social networking server, a client system, a third-party system, or any other approved system or device for suitable applications.

A user node 148 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 148 corresponding to the user, and store the user node 148 in one or more data stores. Users and user nodes 148 described herein may, where appropriate, refer to registered users and user nodes 148 associated with registered users. In addition or as an alternative, users and user nodes 148 described herein may, where appropriate, refer to users that have not registered with the social-networking system. In particular embodiments, a user node 148 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 148 may be associated with one or more data objects corresponding to information associated with a user. In particular embodiments, a user node 148 may correspond to one or more webpages. A user node 148 may be associated with a unique user identifier for the user in the social-networking system.

In particular embodiments, a concept node 150 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 150 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 150 may be associated with one or more data objects corresponding to information associated with concept node 150. In particular embodiments, a concept node 150 may correspond to one or more webpages.

In particular embodiments, a node in social graph 144 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 150. Profile pages may be viewable by all or a selected subset of other users. As an example and not by way of limitation, a user node 148 may have a corresponding user-profile page in which the corresponding user may add content, make declarations, or otherwise express himself or herself. A business page may comprise a user-profile page for a commerce entity. As another example and not by way of limitation, a concept node 150 may have a corresponding concept-profile page in which one or more users may add content, make declarations, or express themselves, particularly in relation to the concept corresponding to concept node 150.

In particular embodiments, a concept node 150 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 148 corresponding to the user and a concept node 150 corresponding to the third-party webpage or resource and store edge 152 in one or more data stores.

In particular embodiments, a pair of nodes in social graph 144 may be connected to each other by one or more edges 152. An edge 152 connecting a pair of nodes may represent a relationship between the pair of nodes. In particular embodiments, an edge 152 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 152 connecting the first user's user node 148 to the second user's user node 148 in social graph 144 and store edge 152 as social-graph information in one or more data stores. In the example of FIG. 1B, social graph 144 includes an edge 152 indicating a friend relation between user nodes 148 of user "Amanda" and user "Dorothy." Although this disclosure describes or illustrates particular edges 152 with particular attributes connecting particular user nodes 148, this disclosure contemplates any suitable edges 152 with any suitable attributes connecting user nodes 148. As an example and not by way of limitation, an edge 152 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 144 by one or more edges 152.

In particular embodiments, an edge 152 between a user node 148 and a concept node 150 may represent a particular action or activity performed by a user associated with user node 148 toward a concept associated with a concept node 150. As an example and not by way of limitation, as illustrated in FIG. 1B, a user may "like," "attended," "played," "listened," "cooked," "worked at," or "watched" a concept, each of which may correspond to an edge type or subtype. A concept-profile page corresponding to a concept node 150 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 152 and a "used" edge (as illustrated in FIG. 1B) between user nodes 148 corresponding to the user and concept nodes 150 corresponding to the song and application to indicate that the user listened to the song and used the application. Moreover, the social-networking system may create a "played" edge 152 (as illustrated in FIG. 1B) between concept nodes 150 corresponding to the song and the application to indicate that the particular song was played by the particular application. In this case, "played" edge 152 corresponds to an action performed by an external application (SPOTIFY) on an external audio file (the song "Across the Sea"). Although this disclosure describes particular edges 152 with particular attributes connecting user nodes 148 and concept nodes 150, this disclosure contemplates any suitable edges 152 with any suitable attributes connecting user nodes 148 and concept nodes 150. Moreover, although this disclosure describes edges between a user node 148 and a concept node 150 representing a single relationship, this disclosure contemplates edges between a user node 148 and a concept node 150 representing one or more relationships. As an example and not by way of limitation, an edge 152 may represent both that a user likes and has used at a particular concept. Alternatively, another edge 152 may represent each type of relationship (or multiples of a single relationship) between a user node 148 and a concept node 150 (as illustrated in FIG. 1B between user node 148 for user "Edwin" and concept node 150 for "SPOTIFY").

In particular embodiments, the social-networking system may create an edge 152 between a user node 148 and a concept node 150 in social graph 144. As an example and not by way of limitation, a user viewing a concept-profile page (such as, for example, by using a web browser or a special-purpose application hosted by the user's client system) may indicate that he or she likes the concept represented by the concept node 150 by clicking or selecting a "Like" icon, which may cause the user's client system to send to the social-networking system a message indicating the user's liking of the concept associated with the concept-profile page. In response to the message, the social-networking system may create an edge 152 between user node 148 associated with the user and concept node 150, as illustrated by "like" edge 152 between the user and concept node 150. In particular embodiments, the social-networking system may store an edge 152 in one or more data stores. In particular embodiments, an edge 152 may be automatically formed by the social-networking system in response to a particular user action. As an example and not by way of limitation, if a first user uploads a picture, watches a movie, or listens to a song, an edge 152 may be formed between user node 148 corresponding to the first user and concept nodes 150 corresponding to those concepts. Although this disclosure describes forming particular edges 152 in particular manners, this disclosure contemplates forming any suitable edges 152 in any suitable manner.

The social graph 144 may further comprise a plurality of product nodes. Product nodes may represent particular products that may be associated with a particular business. A business may provide a product catalog to a consumer-to-business service and the consumer-to-business service may therefore represent each of the products within the product in the social graph 144 with each product being in a distinct product node. A product node may comprise information relating to the product, such as pricing information, descriptive information, manufacturer information, availability information, and other relevant information. For example, each of the items on a menu for a restaurant may be represented within the social graph 144 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 144. The information for a product node may be manipulated by the social-networking system as a product object that encapsulates information regarding the referenced product.

As such, the social graph 144 may be used to infer shared interests, shared experiences, or other shared or common attributes of two or more users of a social-networking system. For instance, two or more users each having an edge to a common business, product, media item, institution, or other entity represented in the social graph 144 may indicate a shared relationship with that entity, which may be used to suggest customization of a use of a social-networking system, including a messaging system, for one or more users.

Messaging Overview and Interfaces

A general overview of messaging techniques is now described.

Figure 2A:
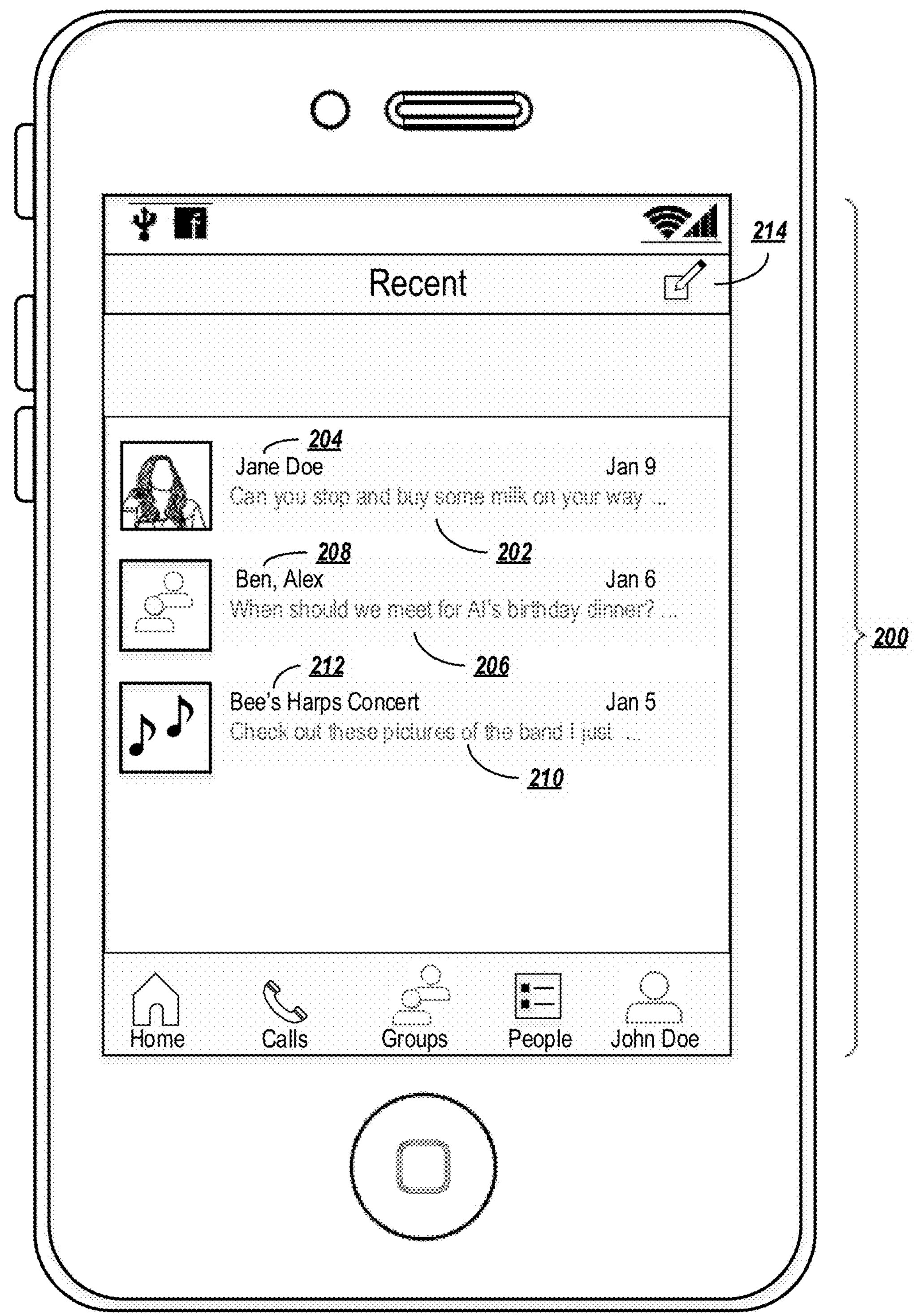
FIG. 2A depicts an exemplary graphical user interface for a messaging application.

Users may interact with a messaging system through a client application. FIG. 2A depicts an example of a client application displaying a messaging interface 200. The messaging interface 200 of FIG. 2A shows an exemplary summary screen that provides an overview of messages recently sent to (or by) the user of the client application.

Messaging systems may support a variety of different types of messages. For example, the messaging interface 200 includes a summary of a one-to-one (or individual) message 202. A one-to-one message is a message exchanged between two entities, so that only the two entities can see and participate in the conversation. For example, in the one-to-one message 202, the current user (Jack Doe) recently received a message from his wife, Jane Doe. The other participant in the conversation is indicated in the interface 200 using an identifier 204 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 2A depicts an exemplary summary of a group conversation 206. In the summary of the group conversation 206, each of the other users participating in the conversation is indicated by respective identifiers 208. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 2A shows an event message 210 sent by the current user (Jack) to the page of an event being organized through a social network. The identifier 212 identifies the name of the event, and an icon is presented identifying this particular event is a concert. In an event message 210, all participants in the event (as a participant is defined, e.g., by the event's social networking page) can view and send event messages 210. Participants may include, for example, people attending the event, fans of the event that have signed up with the event's page to receive messages about the event, event organizers, etc.

By selecting an existing message summary 202, 206, 210, the user can view messages in an existing conversation and add new messages to the conversation. Moreover, the interface 200 includes interface elements 214 allowing the user to create a new message.

Figure 2B:
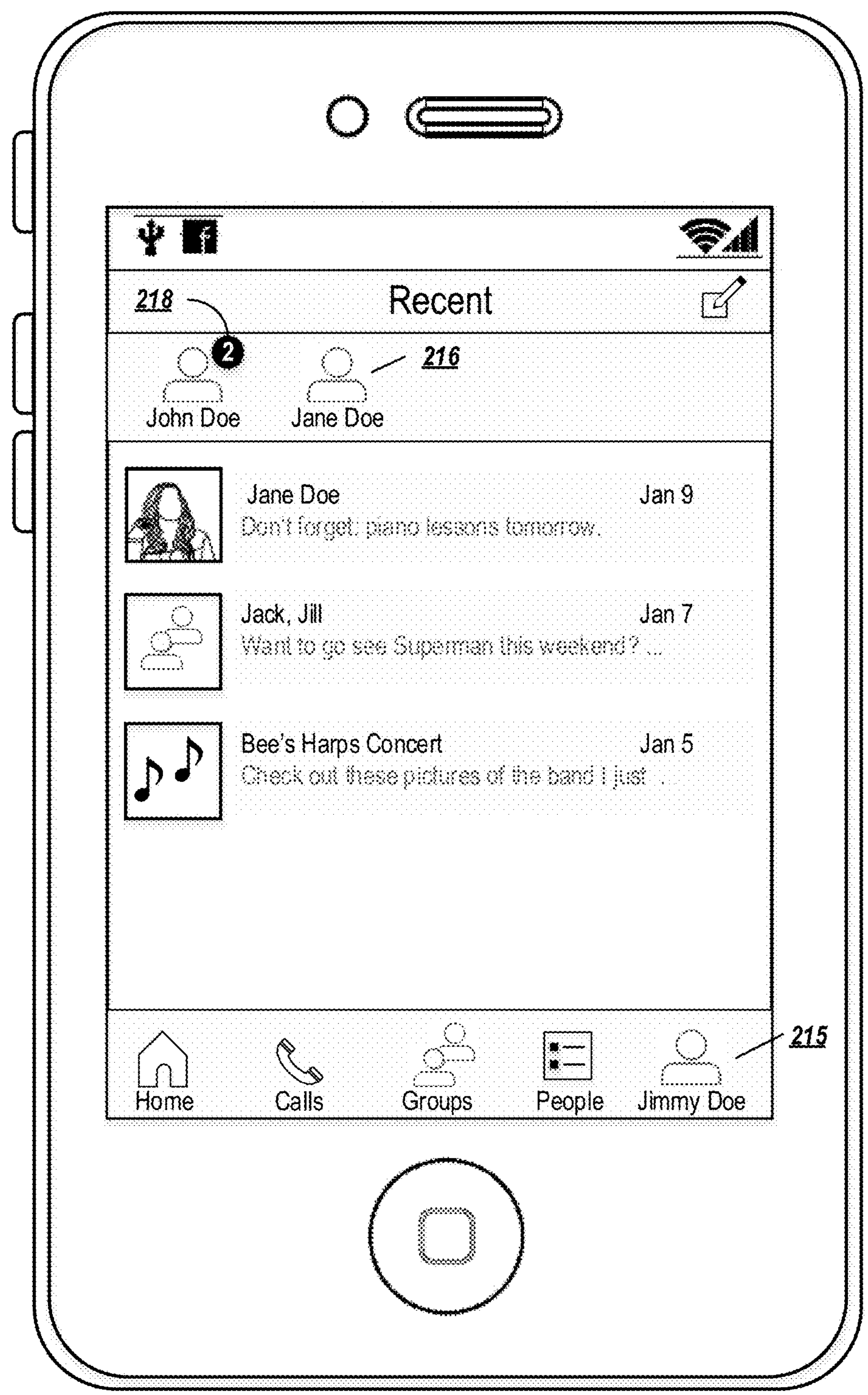
FIG. 2B depicts an exemplary graphical user interface for a messaging application supporting multiple user accounts and account switching.

FIG. 2A depicts an example of an interface displayed when a particular user (in this case, John Doe) is logged into the messaging application. The messaging application may also support multiple user accounts and/or account switching. FIG. 2B depicts an exemplary graphical user interface for such a messaging application.

The user interface of FIG. 2B includes a user account display bar near the top of the interface. The user account display bar includes icons or representations 216 showing the identities of inactive users that are registered to the device but who area not actively logged into the messaging application. For example, in FIG. 2B, the currently active user is Jimmy Doe (as indicated by the icon 215 in the application's main menu bar in the bottom portion of the user interface). The user account display bar at the top of the interface indicates that John Doe and Jane Doe are also registered to the device.

The user account display bar may also indicate, for each of the inactive users, how many unread messages the inactive user has recently received. For example, the interface of FIG. 2B includes a notification badge 218 displayed in proximity to John Doe's inactive user icon, indicating that John Doe has two unread messages.

Figure 2C:
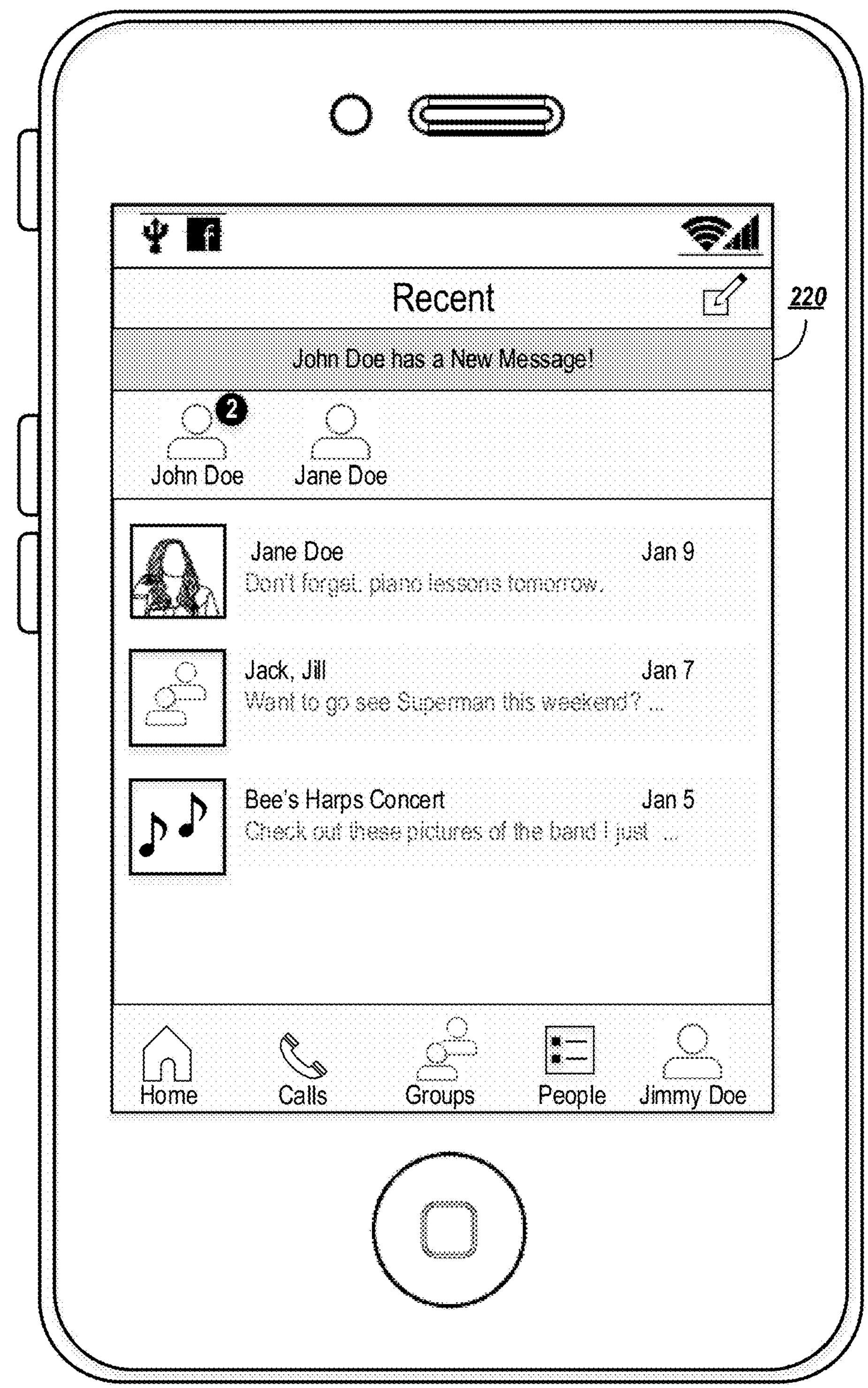
FIG. 2C depicts an exemplary graphical user interface for a messaging application displaying a notification for a logged-out user.

When an inactive user receives a new message on the device, a notification may be displayed, as shown in FIG. 2C. In this example, upon receipt of a notification that an inactive user has received a message, a notification bar 220 appears in the upper portion of the interface. The notification bar 220 may indicate the inactive user who has received the new message but, as discussed in more detail below, may refrain from providing details about the message (such as the sender, time of receipt, and/or content of the message). Thus, the current user of the device will be made aware that the inactive user has received a new message and may, for example, inform the inactive user of receipt of the message.

Figure 3A:
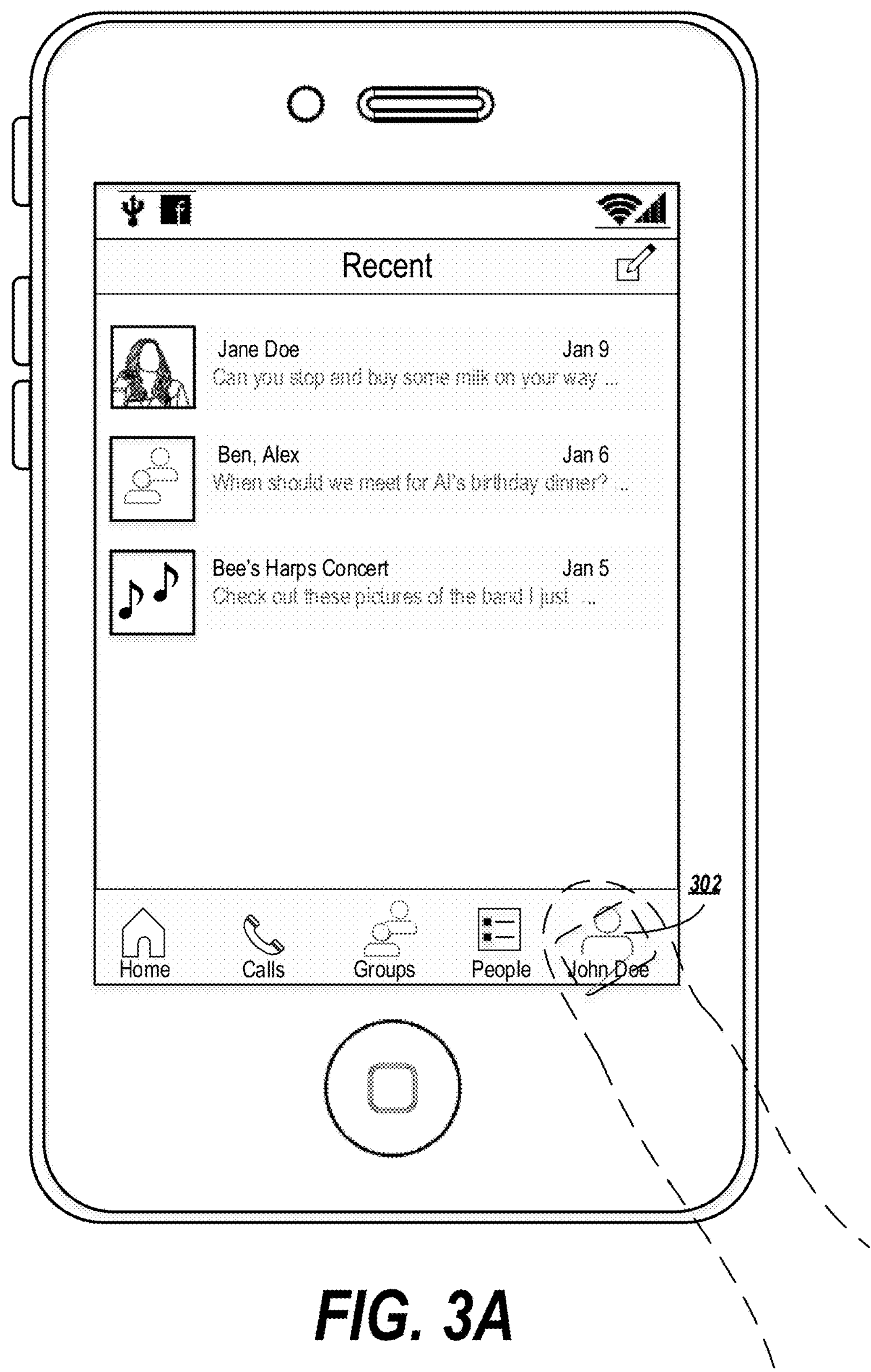
FIG. 3A depicts an exemplary graphical user interface for a messaging application having an icon for accessing a settings menu allowing for account switching.
Figure 3B:
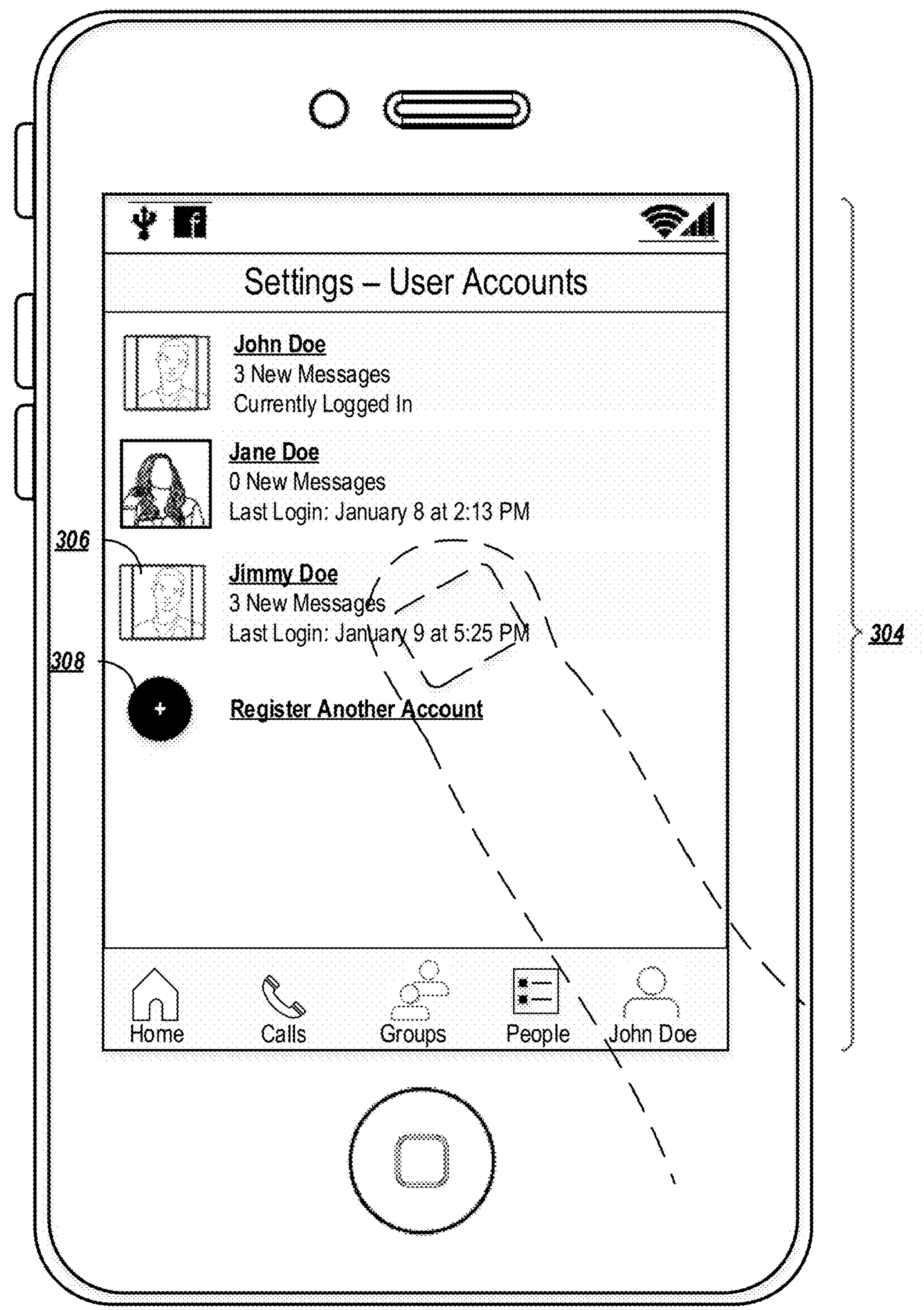
FIG. 3B depicts an exemplary graphical user interface for a messaging application showing a settings menu for account switching.
Figure 3C:
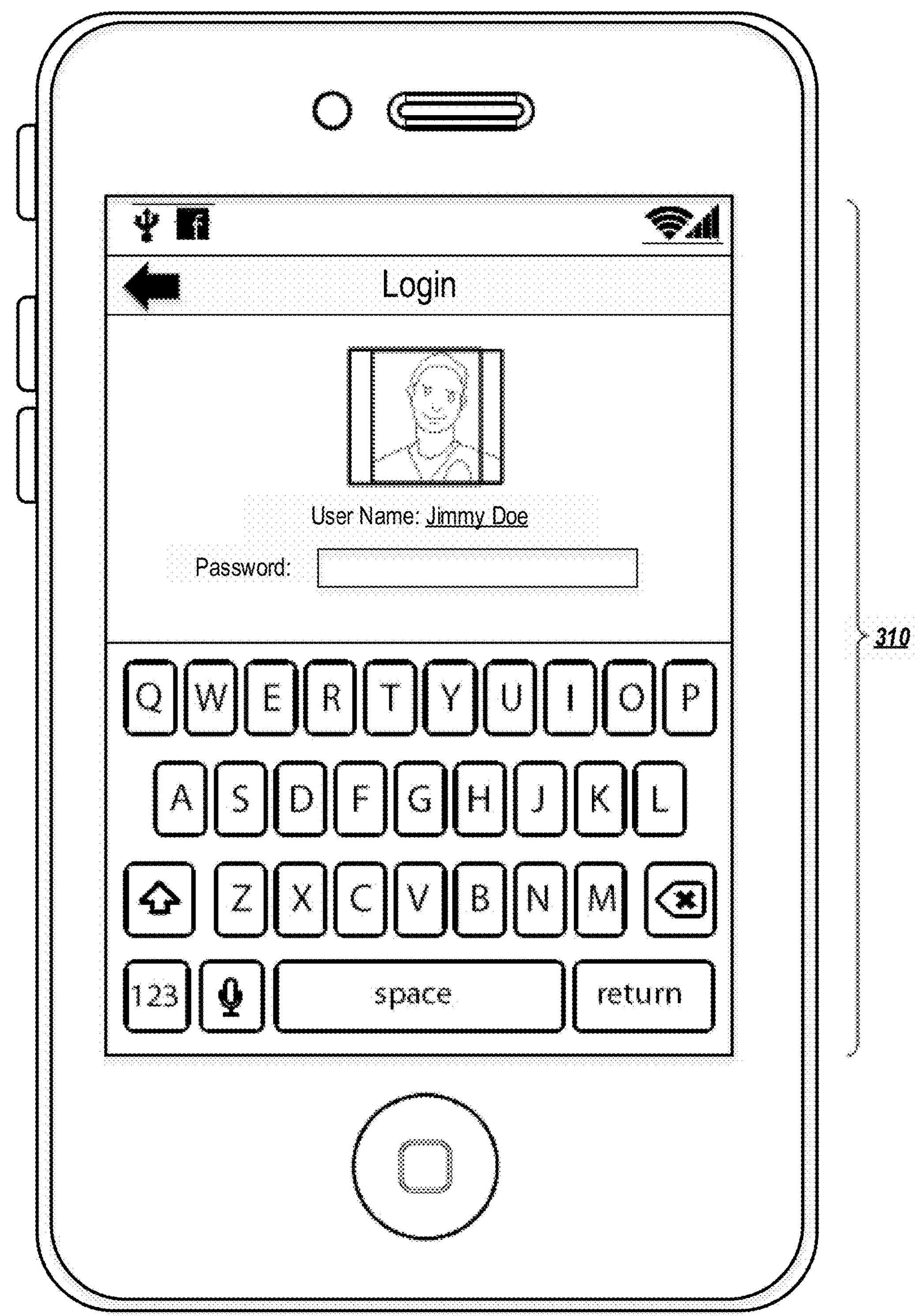
FIG. 3C depicts an exemplary graphical user interface for a messaging application showing a login screen for switching to a different account.

When a currently inactive user wishes to log on to the device (in the process, logging out the currently active user), a variety of techniques may be used. FIGS. 3A-3C depict one exemplary technique, in which inactive users may log into the device through as settings menu.

In FIG. 3A, the user is currently interacting with the recent messages interface for John Doe. In the main menu bar at the bottom of the interface, a user account settings icon 302 is displayed. Selecting the user account settings icon 302 causes the messaging application to display a user account settings interface for the currently active user, which may allow the currently active user to change settings relating to account preferences, among other possibilities. Within the user account settings interface, an option may be presented allowing the user to view the user accounts registered to the device. Upon selecting the option, the application may display a user account interface, such as the user account interface 304 depicted in FIG. 3B.

The user account interface 304 may include an icon or representation 306 for each user account registered to the current device. Furthermore, the user account interface 304 may display summary information for each user account, such as account status (logged in or inactive), the number of unread messages associated with the user account, and/or the last date and time on which the user account was logged in.

Still further, the user account interface 304 may provide an interface element 308 allowing an additional user account to be registered to the device. The additional account may be an existing account already affiliated with the messaging service, or may be a new account with the messaging service.

The user account interface 304 may also provide an interface element allowing a user account currently registered to the device to be de-registered from the device. A de-registration interface may require that the user being de-registered enter their password (or pin, as discussed below) in order to de-register themselves from the device. De-registering the user from the device may prevent the user from showing up as inactive on the device when they are not logged into the device. In some embodiments, the user may be prevented from de-registering with the device if the user's account is not registered with another device (to ensure that the user's account is always reachable on some device), and/or may be prevented from de-registering with the device if the user's account is the only account registered to the device (to prevent the messaging application from becoming unreachable).

In the example of FIG. 3B, the user selects the icon 306 associated with Jimmy Doe's user account, indicating a request to switch from the currently active user account (John Doe) into the selected inactive user account. As shown in FIG. 3C, this action prompts the messaging application to display a login interface 310. In the login interface 310, the user attempting to login is provided with prompts in which the user's login credentials (e.g., user name and password) may be entered. In some embodiments, entry of the user name may not be required (e.g., it may be automatically filled in), because the user name may already be associated with the account registered to the device. Optionally, the user may be permitted to store their messaging service account password and configure the messaging application to log in their user account without requiring that the password be re-entered. Alternatively or in addition, the user may be permitted to associate an alphanumeric pin code with the messaging application of a particular device (or across all devices), allowing the user to log in by entering their pin code instead of the password associated with their messaging service account. This may allow the user to access the account more quickly or efficiently on trusted devices.

The login interface 310 may include an interface element allowing the user to cancel the login operation. For example, a "back" icon may be displayed on the login interface 310. Selecting the "back" interface element may cause the messaging application to revert to the previous interface (e.g., the account settings interface 304).

In some embodiments, selecting the "back" interface element may not immediately revert the application to the previously-logged in user account. Before granting access, the previously-logged-in user may be prompted to enter their password in order to ensure that the previously-logged in user is again attempting to access their messages. In this way, the privacy of each user may be protected: the currently logged-in user may select an inactive user account to log in and may pass the device to the inactive user. The inactive user may then log into their own account, but will be prevented from canceling the operation to view the messages of the previously-logged-in user.

Figure 4A:
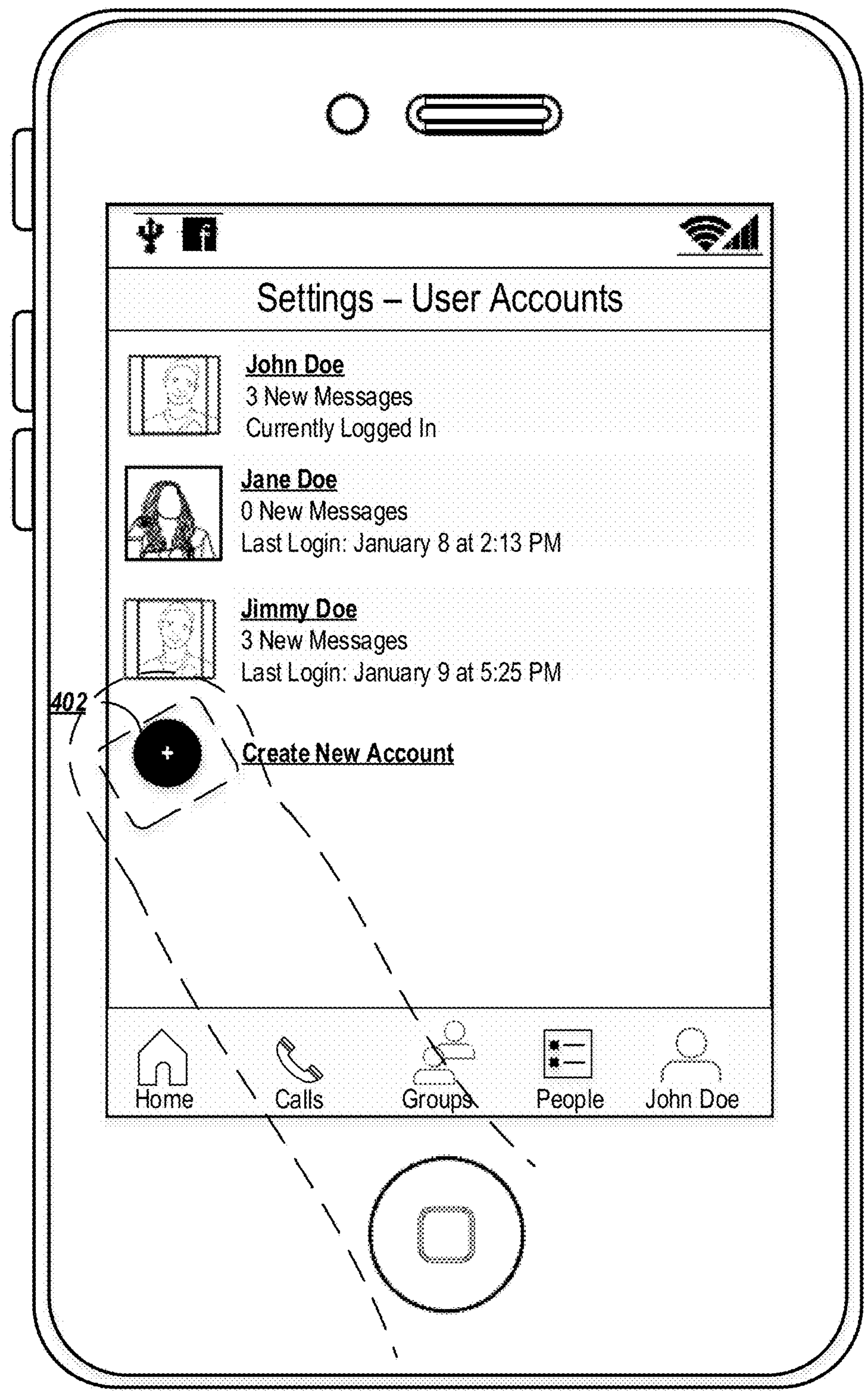
FIG. 4A depicts an exemplary graphical user interface for a messaging application showing a settings screen allowing a new messaging account to be created.
Figure 4B:
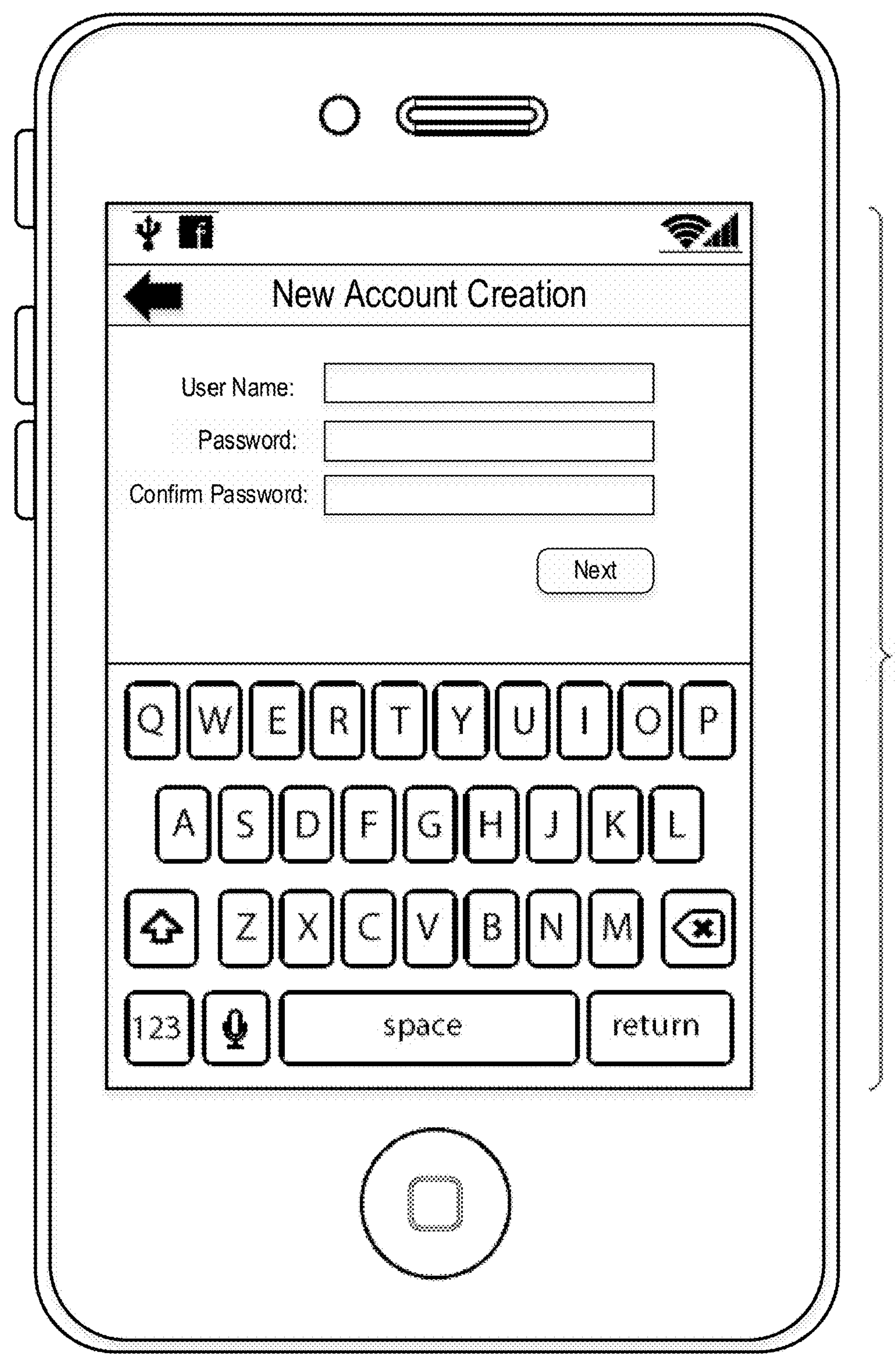
FIG. 4B depicts an exemplary graphical user interface for a messaging application showing a new account creation screen.

In addition to registering and logging in existing users of the messaging service, the messaging application may allow for new user accounts to be created with the messaging service. For example, FIG. 4A depicts a graphical user interface for a messaging application showing a settings screen allowing a new messaging account to be created. The interface includes an account creation interface element 402 that, upon selection, causes the messaging application to display a new account creation interface 404 (FIG. 4B). The new account creation interface 404 allows a new user to establish account credentials, such as a user name and password, with the messaging service. Upon establishing valid account credentials with the messaging service, the new user may be logged in as the active user in the messaging application.

Next, client- and server-side operations are shown in conjunction with data flows for various account switching scenarios.

Account Switching Operations

Figure 5A:
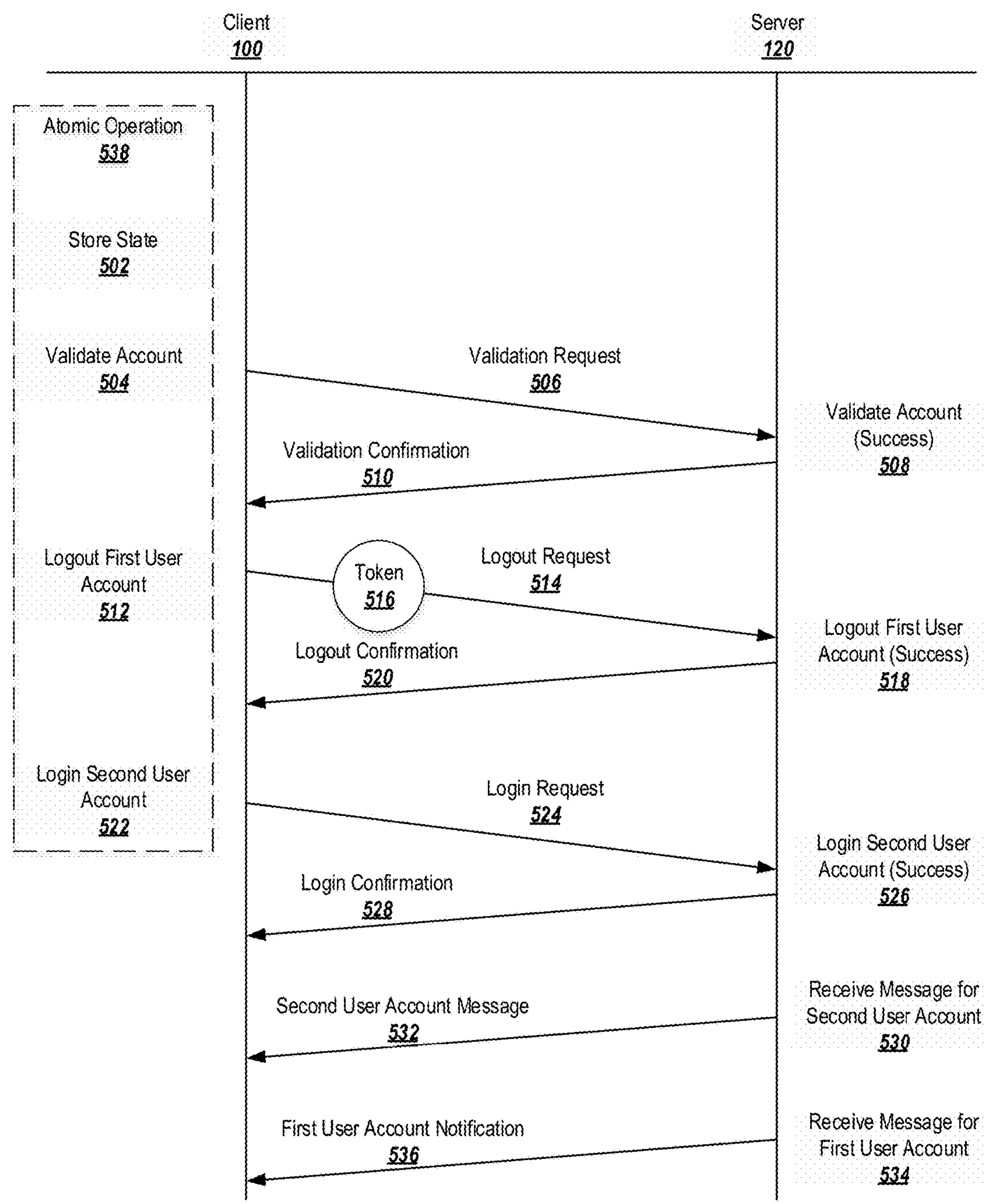
FIG. 5A is a flow diagram showing operations in which a first account is successfully logged out of a client device and a second user account is successfully logged into a client device.

FIG. 5A is a flow diagram showing operations in which a first account is successfully logged out of messaging application on a client device 100 and a second user account is successfully logged into the messaging application on the client device 100. In order to log the users in and out of the messaging application, the client device 100 may communicate with a server device 120 of the messaging service.

In the following examples, the currently active (logged-in) user is referred to as the first user. The messaging application receives a request to switch the active account from the first user to the second user, who may be a currently inactive (logged-out) user or who may be a new user. The request may be, for example, a request to log in a currently inactive user or to create a new user account.

Upon initiating a user account switch, the client 100 may perform a client-side state storage operation 502. The state storage operation 502 may include storing an identity of a currently active user in a dedicated location in memory. Other information associated with the current state of the messaging application, such as an active interface of the messaging application, may also be stored in the state storage operation 502. If the account switching operation fails for any reason, the information stored in the state storage operation 502 may be retrieved and used to return the messaging application to a state consistent with the state that existed prior to the account switching operation was initiated.

The messaging operation may initiate a client-side account validation operation 504. The account validation operation 504 may include collecting information about the second user account, such as login credentials. In some embodiments, the account validation operation 504 only attempts to verify that the second user's account is a valid account (e.g., verifying that the second user's login name is associated with a valid account). In other embodiments, the account validation operation 504 may attempt to verify that credentials entered by the second user (or stored on the client 100) are valid (e.g., the account validation operation 504) may attempt to authenticate the second user. In still further embodiments, if the second user is a new user to the messaging service, the account validation operation 504 may attempt to verify that the new user's requested user name is available on the messaging service (e.g., it is not assigned to another user and meets any requirements of the messaging service, such as those pertaining to length and other user name standards), and that the user's requested password meets the standards of the messaging service.

In order to validate the information associated with the second user's account, the messaging application may generate a validation request 506, which includes the collected information for the second user, and may transmit the validation request 506 to the messaging server 120. At the server side, the server 120 may receive the validation request 506 and may attempt to validate the second user's account information with the messaging service.

In the example of FIG. 5A, the server-side account validation operation 508 is successful (e.g., the second user's user name and password are valid), and so the server 120 generates and transmits a validation confirmation message 510. The client receives the validation confirmation message 510 and proceeds to perform a client-side first user account logout operation 512. The first user account logout operation 512 may involve marking the first user as inactive on the messaging application 100 of the client, (optionally) removing the first user's messages from the memory of the client 100, and transmitting a logout request 514 to the server 120.

The logout request 514 may include a request to log out the first user from the client 100 with the messaging service. Optionally, the logout request 514 may include a token 516, which designates that the first user account is considered to be in an inactive state on the client device 100. The token 516 may be valid for a limited duration (e.g., a duration specified in the token and based on user preferences) or an unlimited duration.

The server 120 may receive the logout request 514 and, in response, may perform a server-side first user account logout operation 518. The server 120 may maintain a log or table indicating which accounts are currently logged in on which devices. The logout operation 518 may involve updating the log to remove an entry indicating that the first user is logged into the client device 100.

If the logout request 514 includes a token 516, the server 120 may process the token 516. For example, the server 120 may update the log or table, or a separate inactive user log or table, to indicate that the first user is currently considered to be in an inactive state on the client 100.

In this example, the logout operation 518 is successful, and so the server 120 generates a logout confirmation message 520 and forwards the logout confirmation message 520 to the client 100.

Upon receiving the logout confirmation message, the messaging application on the client 100 performs a client-side second user account login operation 522 to login the second user as the active user on the client 100. This operation may involve checking the account settings/preferences of the second user, updating interfaces for the second user, requesting the second user's messages from the server 120, etc. Requesting the second user's messages may include retrieving any messages sent to the second user before the second user logged on to the client 100 (e.g., in a batch message retrieval request or state update operation).

As part of the second user account login operation 522, the messaging application may generate and transmit a login request 524 requesting that the second user be logged in as the active user on the client 100. The login request 524 may be received by the server 120, which performs a server-side second user account login operation 526 in response. The second user account login operation 526 may involve updating the active user log or table to indicate that the second user is the currently-logged-in user on the client 100.

In this example, the second user login operation 526 succeeds, and so the server 120 generates and transmits a login confirmation 528 for the client 100.

Next, the server 120 receives a message addressed to the second user in a server-side second user account message receipt operation 530. The server 120 checks the active user log, which was updated in the second user account login operation 526, and determines that the second user is active on the client 100. Accordingly, the server 120 transmits the received message as a second user account message 532 to the client 100. The second user account message 532 may include the full content of the received message, including the sender of the message, a list of recipients of the message, and a timestamp of the message. Upon receiving the second user account message 532, the messaging application on the client 100 may generate a notification and display the full content of the message.

Next, the server 120 receives a message addressed to the first user in a server-side first user account message receipt operation 534. The server 120 checks the active user log, which was updated in the first user account logout operation 518, and determines that the first user is not currently active on any device. However, if the server 120 processed the token 516 as part of the logout request 514, the server 120 may determine that the first user is currently inactive on the client 100.

Accordingly, the server 120 may generate and transmit a first user account notification 536 to the client 100. The first user account notification may include an indication that a message was received for the first user, but may omit further details (such as the message content, the sender, the recipients, and the timestamp of the message). Upon receiving the first user account notification 536, the messaging application on the client 100 may generate and display a notification for the first user, and may update any relevant messaging application interfaces to show a new message awaiting the first user.

The state storage operation 502, the account validation operation 504, the first user account logout operation 512, and the second user account login operation 522 may be performed as an atomic operation 538. An atomic operation is an operation, potentially including multiple sub-operations, that is performed as a single unit. The failure of one sub-operation of the atomic operation 538 may cause the entire atomic operation 538 to fail and may cause the messaging application to revert to a state consistent with the state that was in existence before any of the sub-operations of the atomic operation 538 were performed. One of the sub-operations of the atomic operations may be considered to have failed if the sub-operation fails on the client side, or if the sub-operation fails to receive confirmation that a corresponding operation was successfully performed on the server side (or receives an indication that the operation failed).

A series of examples in which sub-operations of the atomic operation 538 cause a failure of the atomic operation 538 are next described.

Figure 5B:
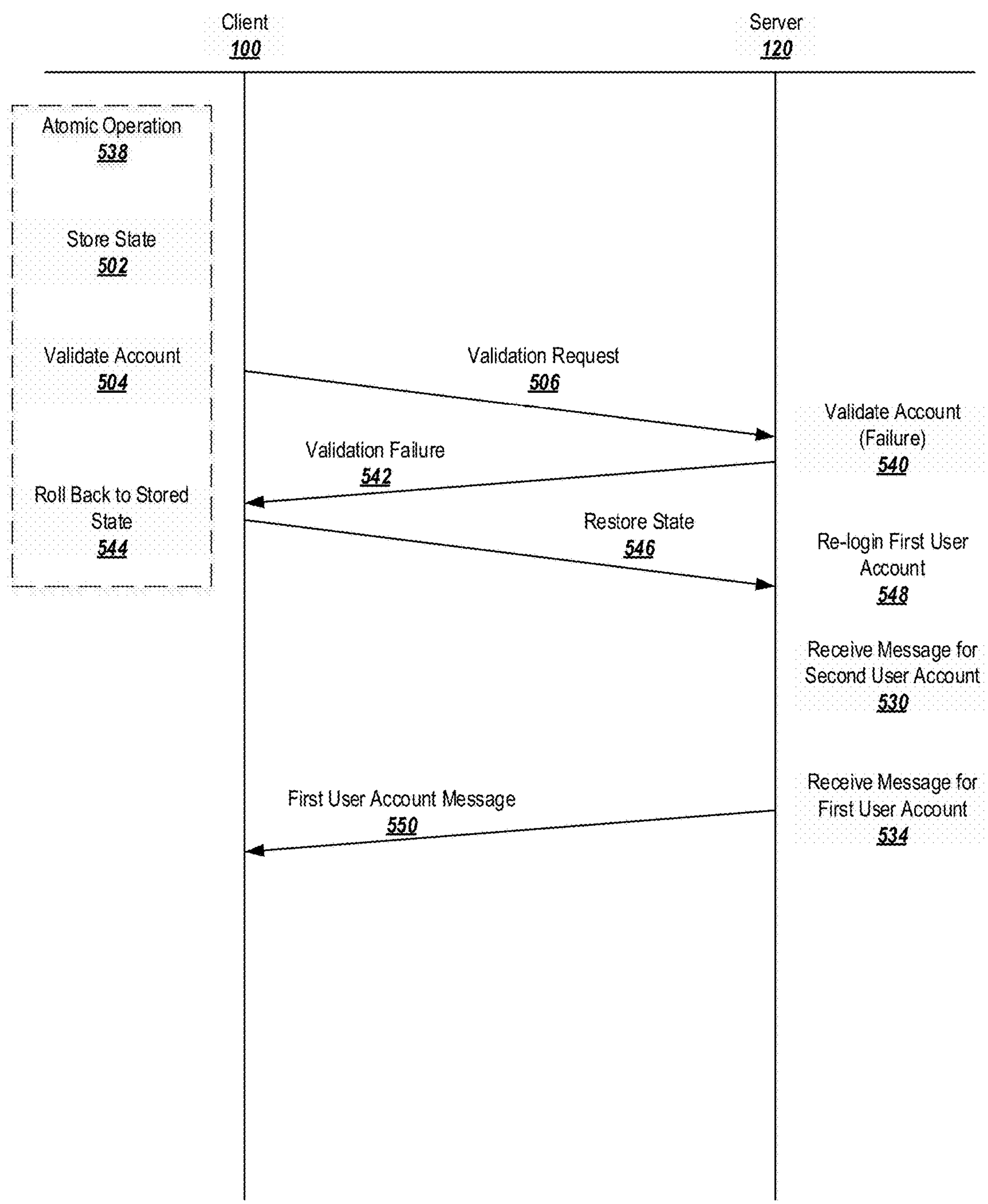
FIG. 5B is a flow diagram showing operations in which validation of a second user account fails.

FIG. 5B is a flow diagram showing operations in which validation of the second user account fails. In this example, the state is successfully stored at the state storage operation 502, but the server 120 is unable to validate the second user account information in a server-side account validation operation 540. The validate operation could also fail at the client side (e.g., due to a failed transmission), or a network message may be lost in transmission.

The server 120 reports the failure to the client with a validation failure 542, at which point the messaging application on the client 510 causes the messaging application to revert to the stored state in a state restoration operation 544. The state restoration operation 544 may include setting the currently-active user to the first user, retrieving the first user's messages from the server 120, etc.

The messaging application may inform the server 120 that the messaging application is restoring the state with a state restoration message 546. In response to receiving the state restoration message 546, the server 120 may take any necessary steps to render its own logs, tables, and settings consistent with those on the client 100. For example, if the server 120 has logged the first user out of the messaging service or flagged the user as in active, the server 120 may perform a re-login operation 548 for the first user. The re-login operation 548 may involve setting the first user as active; optionally, the re-login operation 548 may not require that the server receive the first user's credentials, since (from the perspective of the client 100) the first user never logged out of the messaging application.

Upon receiving a message for the second user account, the server 120 takes no action (at least not with respect to the client 100; if the second user is active or inactive on another client, the server 120 may forward the message or a notification, respectively, to the other client). Because the second user is not logged into the client 100, the client 100 is not authorized to receive the message. In this example, it is assumed that the second user is also not currently considered inactive on the client 100 (e.g., not having been previously logged in and then logged out on the client 100), and so the client 100 is also not authorized to receive notifications of the receipt of the message.

Upon receiving a message for the first user account, the server 120 generates a first user account message 550 (including the full content of the received message, the sender, other recipients, and the timestamp) and transmits it to the client 100. Because the first user is still considered to be actively logged-in to the messaging application on the client 100, the client 100 is authorized to receive the full content of the message from the server 120.

Figure 5C:
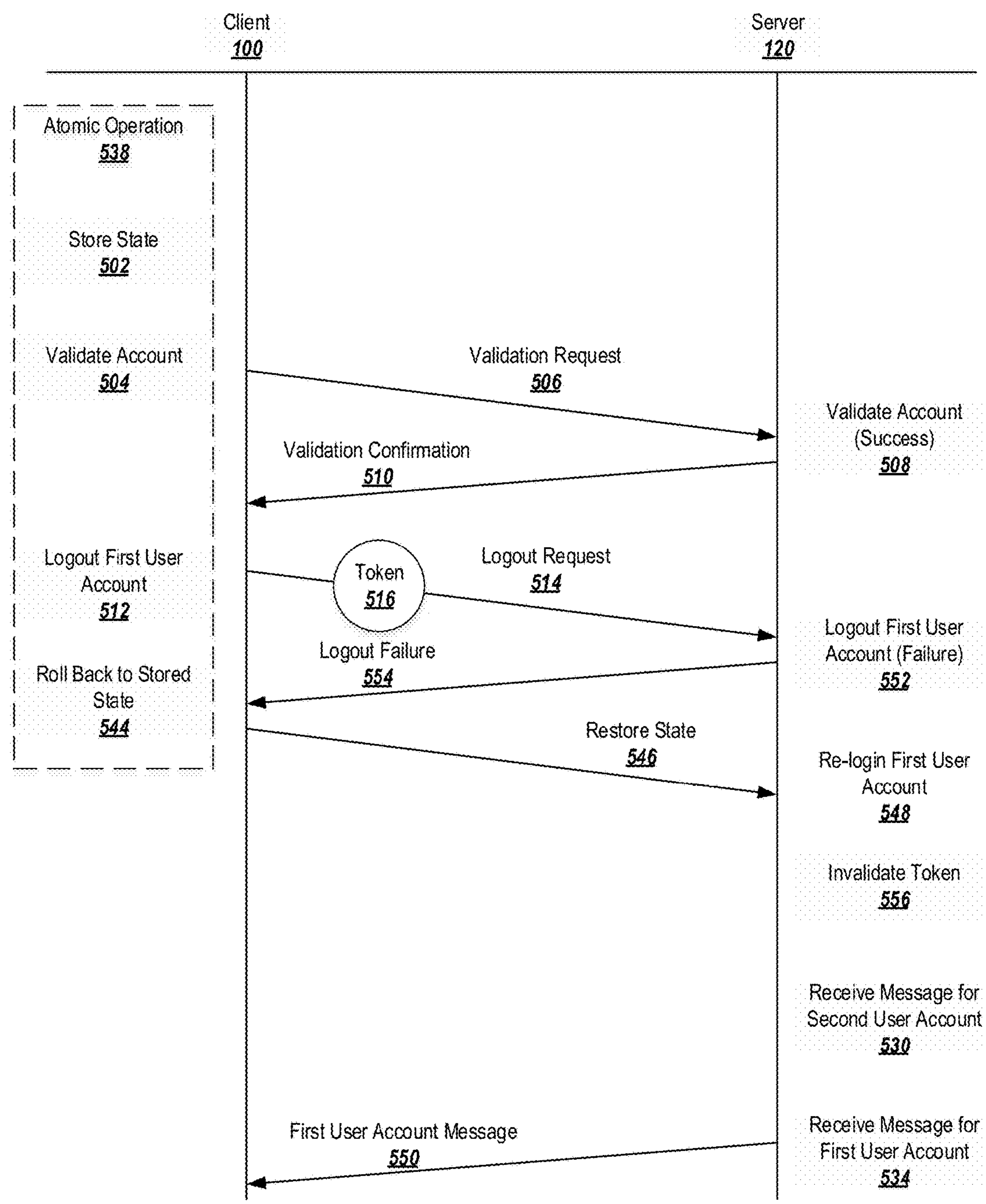
FIG. 5C is a flow diagram showing operations in which a first account fails to log out of a client device.

FIG. 5C is a flow diagram showing operations in which a first account fails to log out of a client device. In this example, the server-side logout operation 552 fails when the client 100 requests that the first user be logged out. This may occur for a number of reasons—for example, if the server 120 is unable to update its log or table of active users. The logout operation could also fail at the client side (e.g., due to a failed transmission), or a network message may be lost in transmission.

Upon failing in the logout operation 552, the server 120 transmits a logout failure 554 to the client 100. In response to receiving the logout failure 554, the client 100 rolls back to the previously-stored state (operation 544), and the server re-logs in the first user (operation 548).

In this example, a token 516 was submitted along with the logout request. Assuming that the token 516 was processed, the server may invalidate the token (operation 556) so that the first user is not considered inactive on the client 100. The token may be invalidated after the first user is re-logged in (operation 548), in order to prevent a gap in which the first user is not considered logged in and is also not considered inactive).

As was the case in FIG. 5B, when the server receives a message for the second user account, no action is taken (because the second user is not considered to be active or inactive on the client 100). Receipt of a message for the first user causes the full content of the message to be transmitted to the client 100.

Figure 5D:
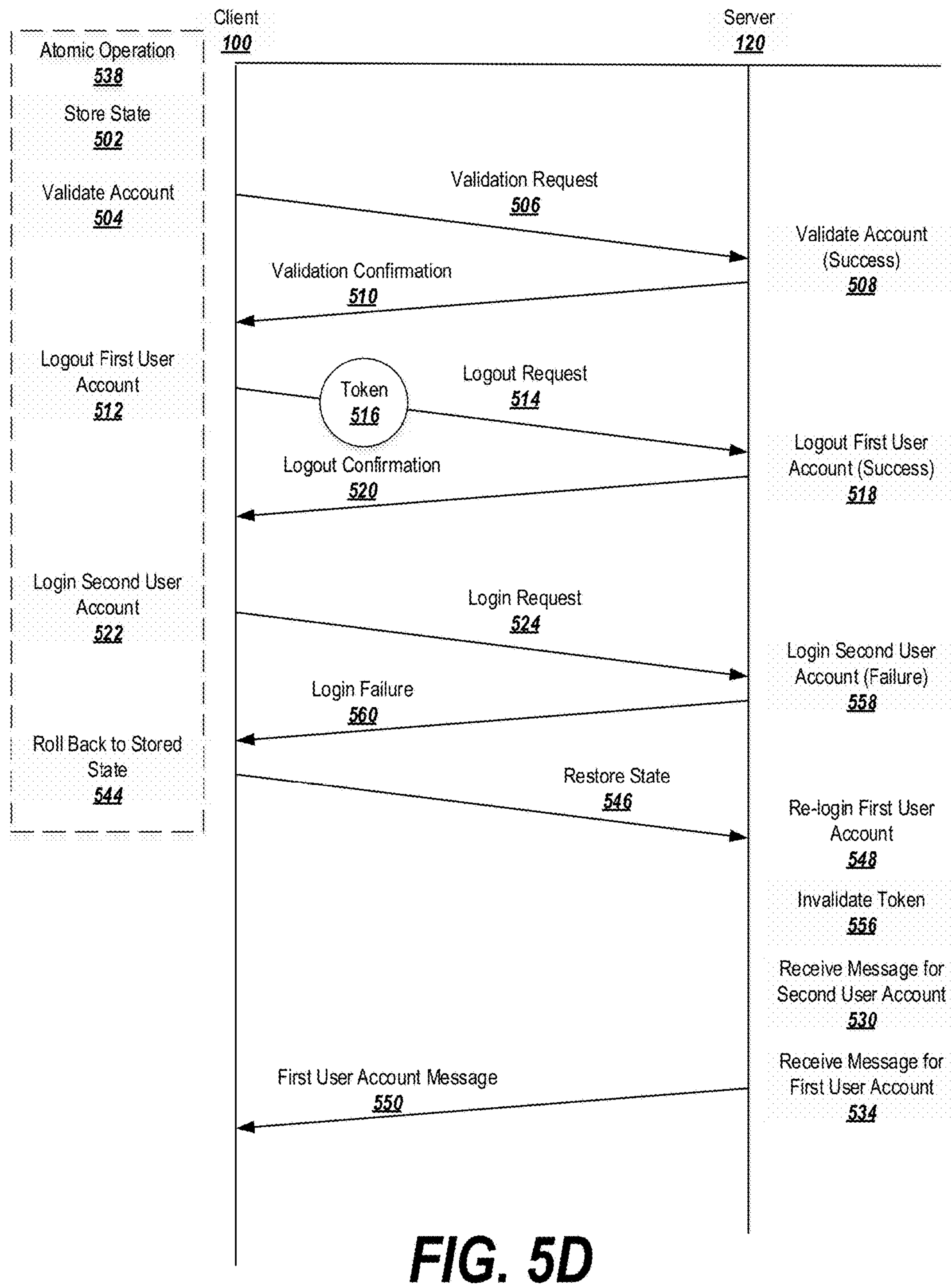
FIG. 5D is a flow diagram showing operations in which a first account is successfully logged out of a client device but a second user account fails to log into a client device.

FIG. 5D is a flow diagram showing operations in which a first account is successfully logged out of a client device but a second user account fails to log into a client device. In this example, failure of the server-side second user account login operation (operation 558) causes the client and server to revert to the previous state, re-logging in the first user. The login operation could also fail at the client side (e.g., due to a failed transmission), or a network message may be lost in transmission. Once again, failure of one of the sub-operations of the atomic operation 538 causes a failure of the entire atomic operation 538, and only messages designated for the first user are forwarded from the server 120 to the client 100.

Figure 5E:
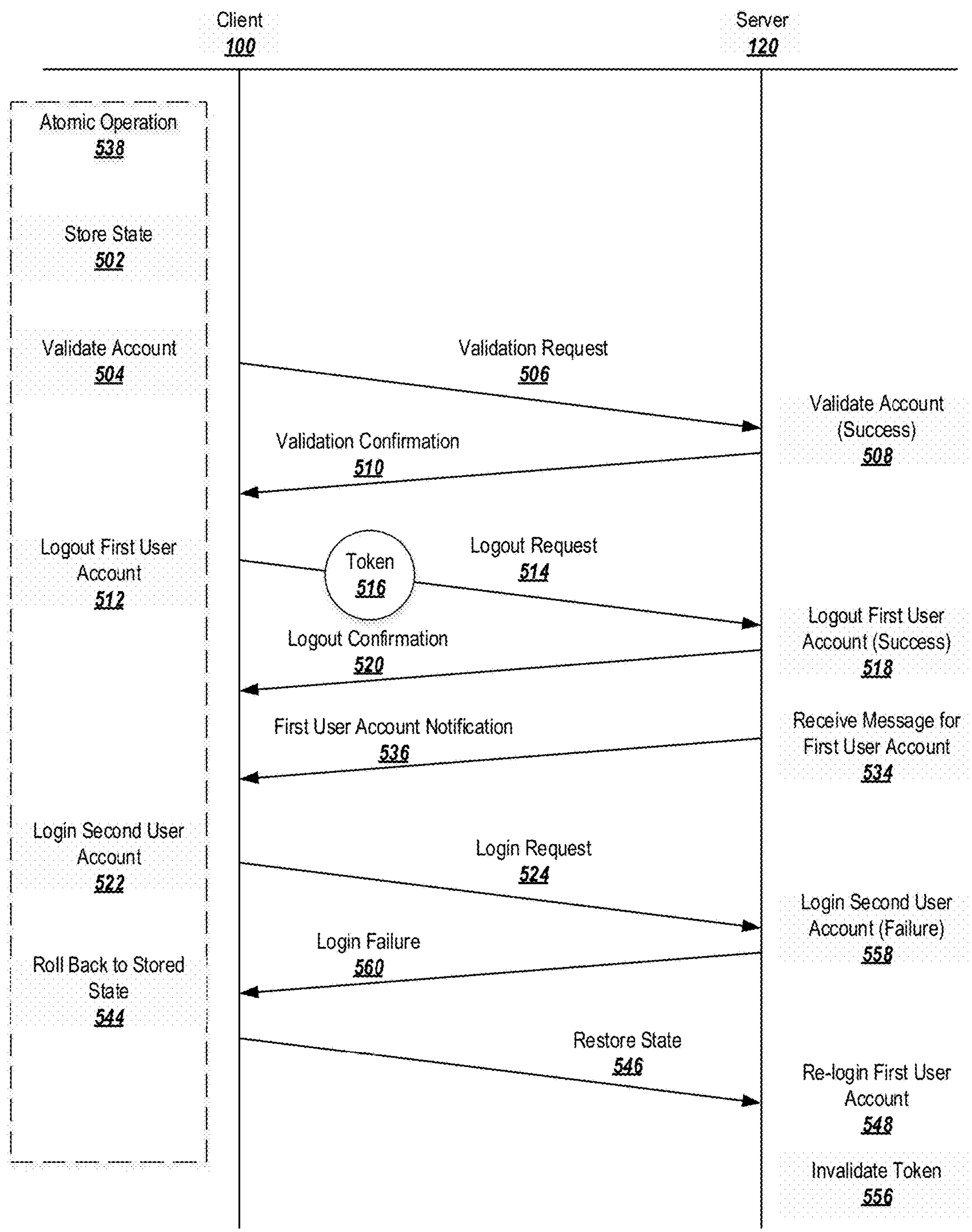
FIG. 5E is a flow diagram showing operations in which a first account is successfully logged out of a client device but a second user account fails to log into a client device, and a message is received for the first user after the first user is logged out.

FIG. 5E is a flow diagram showing operations in which a first account is successfully logged out of a client device but a second user account fails to log into a client device (similar to FIG. 5D), and a message is received for the first user after the first user is logged out. More specifically, a message is received for the first user account after the first user account is logged out (at operation 518), but before the client attempts to (and fails) log in the second user account.

In this example, at the time of receipt of the message for the first user account, there is no active account currently associated with the client 100. However, because the token 516 was provided as part of the logout request 514, the server 120 has marked the first user account as being inactive on the client 100. Accordingly, the server 120 transmits a first user account notification 536, including an indication that a message was received. The notification 536 does not include the content of the message, since the first user is flagged as inactive on the client 100. Nonetheless, the messaging application on the client 100 remains reachable due to the fact that the first user is present (even if inactive) on the messaging application.

Next, exemplary methods for performing account switching are described with reference to FIGS. 6A-6B and 7A-7B.

Methods for Account Switching

Figure 6A:
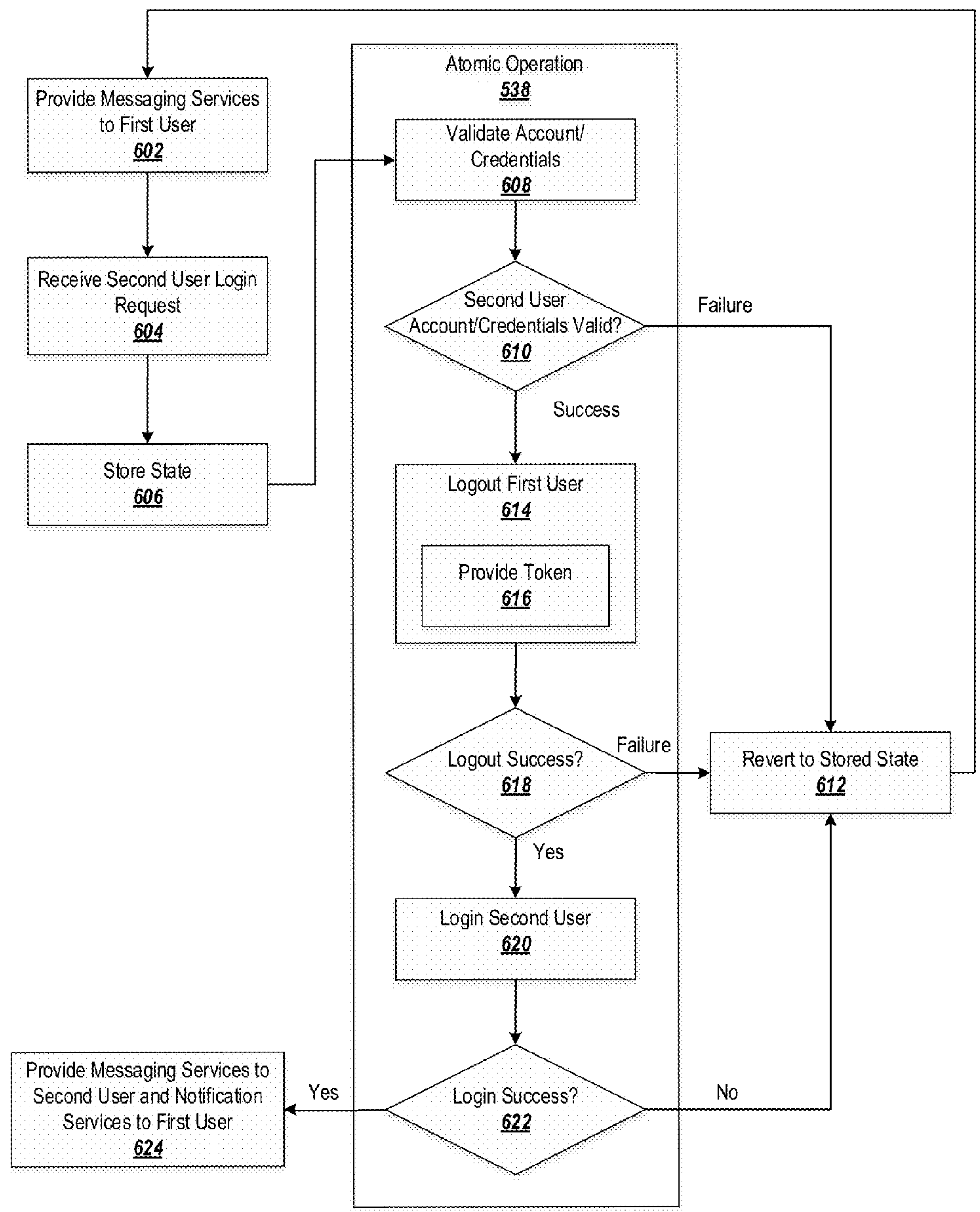
FIG. 6A is a flowchart depicting operations performed by a messaging application on a client device.

FIG. 6A is a flowchart depicting operations performed by a messaging application on a client device. The operations may be embodied as client-side messaging logic 600. The logic 600 may be implemented at least partially in hardware.

Processing begins at block 602, where messaging services are provided to a first user via the messaging application on the client. The messaging services may include sending and receiving messages, the maintaining, adding, and looking up contacts through the messaging service, providing notifications of new messages, etc. The first user may be considered to be logged in to the messaging application and/or the messaging service at block 602.

At block 604, the messaging application receives a second user login request. The second user login request may be a request to log in a second user registered to the device, to register a second user with the device, or to create a new user account with the messaging service for the second user, among other possibilities.

At block 606, the messaging application may store the current state at the time that the second user login request was received. The stored state may include an indication that the first user is currently logged in, a list of currently inactive users (if applicable), interface or account preferences currently in force, etc.

At block 608, the messaging application may validate the existence of the second user's account and/or any credentials associated with the second user's account. For example, the messaging application may generate a validation request including the second user's account information and may transmit the validation request to a messaging server.

At block 610, the messaging application determines whether the validation of the second user's account/credentials succeeded or failed. The validation may fail, for example, if the messaging application is unable to generate a suitable validation request, if the server is unable to process the validation request, if the server processes the validation request but the second user account/credentials is/are determined to be invalid, and/or is the validation request message from the client and/or the validation confirmation/failure message from the server are lost in transmission, among other possibilities.

If the determination at block 610 is "FAILURE," then processing proceeds to block 612 and the messaging application reverts to the state stored at block 606. For example, the application may re-login the first user (or may flag the first user as active, if the first user has not yet been logged off), may apply the stored interface or account preferences, etc. The processing at block 612 may involve communicating the intent to revert to the stored state to the messaging server, which may perform companion processing to ensure that the server's state is consistent with the client's state.

If the determination at block 610 is "SUCCESS," then processing proceeds to block 614 where the first user is logged out. This may involve flagging the first user as inactive on the messaging application, purging the first user's messages from the memory of the client device, and performing any tear-down actions prescribed by the messaging service when a user logs out on a client. The messaging application may generate a logout request message for the first user and may transmit the logout request message to the messaging server.

Optionally, as part of the processing at block 614, the messaging application may provide an inactive user token to the messaging server at block 616. The inactive user token 616 may flag that the first user account is no longer active on the messaging application of the client device, but is available as an inactive user account for receiving limited notifications.

At block 618, the messaging application may determine if the first user was successfully logged out. If the determination at block 618 is "FAILURE," then processing may proceed to block 612 and the messaging application may revert to the state stored at block 606. The logout may fail, for example, if the messaging application is unable to perform some of the logout/teardown operations prescribed by the messaging service, if the server is unable to process the logout request, if the server processes the logout request but is unable to log out the first user, and/or is the logout request message from the client and/or the logout confirmation/failure message from the server are lost in transmission, among other possibilities.

If the determination at block 612 is "SUCCESS," then processing may proceed to block 620. At block 620, the messaging application may perform a second user account login operation. Logging in the second user may involve flagging the second user as active on the messaging application, retrieving the second user's messages from the messaging server, and performing any set-up actions prescribed by the messaging service when a user logs in on a client. The messaging application may generate a login request message for the second user and may transmit the logout login message to the messaging server.

At block 622, the messaging application may determine if the second user was successfully logged in. If the determination at block 622 is "FAILURE," then processing may proceed to block 612 and the messaging application may revert to the state stored at block 606. The login may fail, for example, if the messaging application is unable to perform some of the login/setup operations prescribed by the messaging service, if the server is unable to process the login request, if the server processes the login request but is unable to log in the second user, and/or is the login request message from the client and/or the login confirmation/failure message from the server are lost in transmission, among other possibilities.

If the determination at block 622 is "SUCCESS," then processing may proceed to block 624. At block 624, the messaging application provides full messaging services to the second user (e.g., maintenance of contacts, receiving messages including full content, notifying of new messages on the second user account, etc.). The messaging application also provides notification services to the first user, who is flagged as inactive on the device. The notification services may include providing notifications upon the receipt of messages at the messaging application designated for the first user, without providing information such as the sender of the message, timestamp of the message, and content of the message.

Blocks 608, 614, 616, and 620 (and optionally block 606) may be performed as an atomic operation 538. In other words, a failure at any one of these blocks (e.g., a "NO" determination at any of blocks 610, 618, or 622) may cause a failure of the entire atomic operation, causing the system to revert to the stored state at block 612.

Figure 6B:
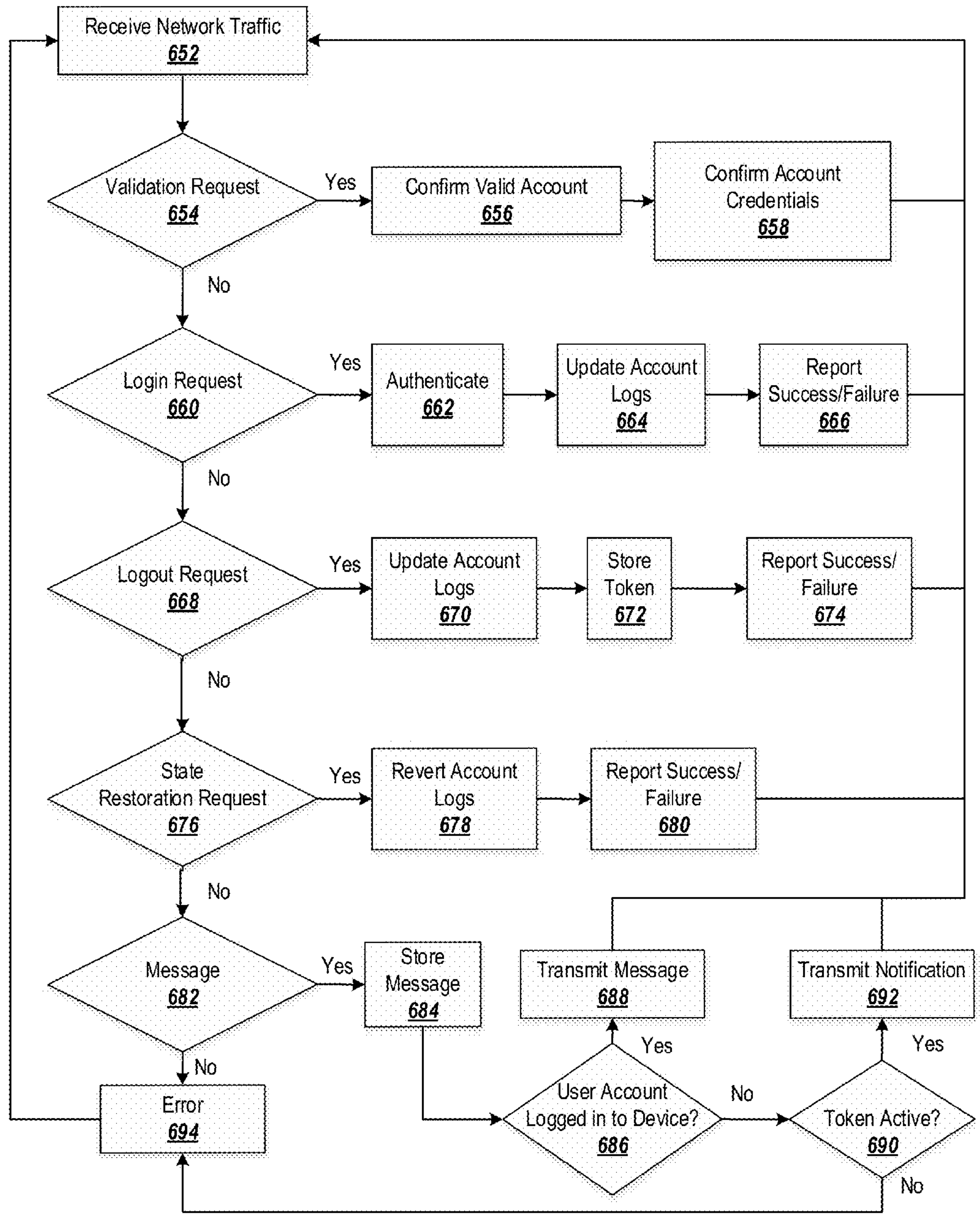
FIG. 6B is a flowchart depicting operations performed by a messaging server on a server device.

FIG. 6B is a flowchart depicting operations performed by a messaging server on a server device. The operations may be embodied as server-side messaging logic 650. The logic 650 may be implemented at least partially in hardware.

At block 652, the server may receive a network communication. For example, the server may receive network traffic on a communication interface, which may include various types of communications associated with the messaging service. In some embodiments, the communications may be associated with a header that identifies a type of the communication. The header may be consulted in the determination steps of the server-side messaging logic, as described below. For the sake of brevity, only some types of network communications associated with the messaging service are next described. One of ordinary skill in the art will recognize that other types of network communications may also be received and processed.

At block 654, the messaging server determines if the network communication is a validation request. If so, processing proceeds to block 656, where the server processes the information in the validation request to determine if the account that is the subject of the validation request is a valid account. For example, the messaging server may access a database of users of the messaging service and determine whether a user name supplied with the validation request is a valid user name on the messaging service. Processing may then optionally proceed to block 658, if the validation request included user credentials (e.g., a password, pin, and/or authentication code) for the account. At block 658, the server may attempt to authenticate the account credentials with the messaging service.

The server may report a success or failure in response to the validation request. Processing then may return to block 652, and the server may await further network traffic.

At block 660, the server determines whether the network communication was a login request. If so, then at step 662, the server attempts to authenticate the user for whom the login request was submitted. For example, the server may check the user's login ID and password/pin/authentication code against a list maintained by the messaging service.

At block 664, the server may update one or more account logs associated with the messaging service. The account logs may include a list of active and/or inactive users, and a mapping describing which user is active/inactive on which client device. An exemplary account log is described in more detail in connection with FIG. 7B.

If the server is unable to authenticate the user account at block 662, or if the server is unable to update the account logs at block 664, then at block 666 the server may report a failure to the client that submitted the login request. If the server is able to authenticate the user account and is able to update the account logs, then the server may report a successful login at block 666. Processing may then return to block 652 and the server may await new network traffic.

At block 668, the server determines whether the network communication was a logout request. If so, then at block 670, the server may update one or more account logs associated with the messaging service. The account logs may include a list of active and/or inactive users, and a mapping describing which user is active/inactive on which client device. An exemplary account log is described in more detail in connection with FIG. 7B. Optionally, if the logout request includes an inactive user token, then at block 672 the server may store the token (e.g., by copying information form the token into the account logs).

If the server is unable to update the account logs at block 670, or if the server cannot store the token at block 672, then at block 674 the server may report a failure to the client that submitted the logout request. If the server is able to update the account logs and store the token, then the server may report a successful login at step 6744. Processing may then return to block 652 and the server may await new network traffic.

At block 676, the server determines whether the network communication was a request to revert a messaging application on a client to a stored state. The request may include details about the state stored on the client device (e.g., an identity of an active user, a list of inactive users, etc.). At block 678 the server may revert the stored account logs to a state consistent with the state specified in the state restoration request, and may report a success or failure at block 680. Processing may then return to block 652 and the server may await new network traffic.

At block 682, the server determines whether the network communication was a message addressed to a user account.

At block 684, the server may optionally store the message. In some embodiments, the messaging service may maintain messages in a centralized location, such as at a server. In other embodiments, messages may be pushed to a client device and not stored in a centralized location. In such embodiments, step 684 may be skipped; if the message is addressed to a user that is not currently active, then the message may be temporarily stored until the user becomes active.

At block 686, the server may determine whether the user to whom the message is addressed is currently logged into a messaging application on a client device. For example, the server may check the account logs and, if the user is identified as active, the server may retrieve the mapping of the user to a particular client device. If the determination at block 692 is "YES," then processing may proceed to 688 and the entire message (including the content of the message, the identity of the sender and any additional recipients, a timestamp, etc.) may be transmitted to the identified client device. Processing may then return to block 652 and the server may await new network traffic.

If the determination at block 686 is "NO," then at block 690 the server may determine whether the user is currently listed as inactive on any client device. For example, the server may consult the account logs to determine if an inactive user token is currently associated with the user's account. If so, then the server may retrieve the client device mapped to the user's account in the account logs, and at block 692 may transmit a notification that a message has been received for the inactive user. The notification may include an indication that the user has received a message, but may omit details of the message (including the content of the message, the identity of the sender and any additional recipients, a timestamp, etc.). Processing may then return to block 652 and the server may await new network traffic.

It is also possible that a user account will be active on one device and inactive on one or more other devices. In this case, a message directed to the user may be forwarded to the active client device (in its entirety), while a notification may be sent to the inactive client devices.

If the server is unable to identify a type of the message, the server may report an error to the client at block 694. Block 694 may also be triggered if a message is received for a user that is not logged in to any device ("NO" at block 686) and that is not inactive on any device ("NO" at block 690), i.e. the user account is unreachable. Predefined error processing may occur in this block in order to diagnose or fix the problem that caused the error. Processing may then return to block 652 and the server may await new network traffic.

Figure 7A:
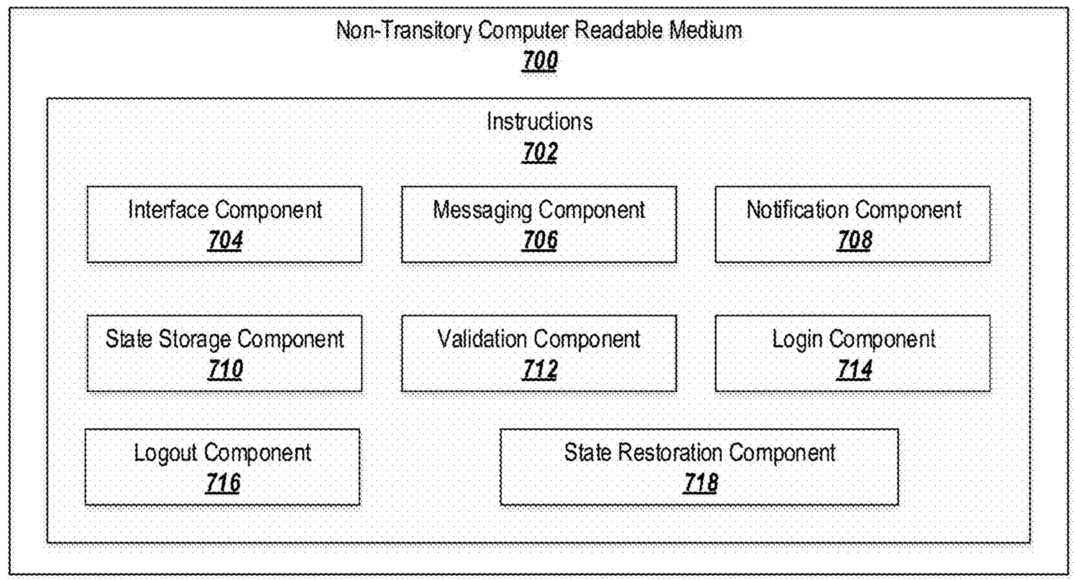
FIG. 7A depicts exemplary instructions stored on a non-transitory computer readable medium for performing operations corresponding to FIGS. 6A and 6B.

The operations described above may be implemented as instructions executable by one or more processors. FIG. 7A depicts exemplary instructions stored on a non-transitory computer readable medium for performing operations corresponding to FIGS. 6A and 6B.

Either or both of the client-side messaging logic 600 and/or the server-side messaging logic 650 may be implemented using a set of components embodied as instructions 702 stored on a non-transitory computer-readable medium 700. The components may include, for example, an interface component 704 for receiving and transmitting information via a network. The interface component 704 may include, or may interface with, a network interface card (NIC) or other networking hardware for receiving signals from, and transmitting signals to, a network.

A messaging component 706 may be configured to generate and/or receive messages for the messaging application on the client device, and/or to receive and transmit messages on the server device. On the client side, the messaging component 706 may provide an interface for composing new messages, selecting recipients for the messages, viewing received messages, etc. On the server side, the messaging component 706 may receive messages from clients and direct the messages to their recipients.

A notification component 708 may be configured to provide notifications to active or inactive users. On the client side, the notification component 708 may generate notifications for inactive users which indicate that a message has been received (without providing additional information about the application). The notification component 708 may also generate notifications for active users when a message is received for the active user. Notifications for active users may provide additional notification, such as the sender, timestamp, additional recipients, and/or content of the message. On the server side, the notification component 708 may generate notifications when a message is received for a user that is currently listed as inactive on a client device.

A state storage component 710 may be configured to store a current state of a messaging application on a client device. The state may be stored at the client device and/or at the server. The state may include information pertaining to the current configuration or setup of the messaging application, including an identification of the currently-active user, a list of currently inactive users, interface preferences, etc. On the client side, the state storage component 710 may save this information to a dedicated location in memory on the client device and/or may transmit this information to the server. On the server side, the state may be stored in a table or log indexed (for example) by an identifier of the client device.

A validation component 712 may be configured to validate whether a user account is a valid account and/or to validate credentials associated with the user account. On the client side, the validation component 712 may generate a validation request including a user identifier and/or account login credentials. The user identifier and/or login credentials may be entered into an interface of the messaging application, may be retrieved from a storage associated with the messaging application (in the event that the user has authorized the messaging application to store their account information), and/or from a social networking application (or other type of related application) associated with the messaging application. On the server side, the validation component 712 may receive a validation request including a user identifier and/or login credentials, and may validate the received information with the messaging service. For example, the validation component 712 may consult a table or list of valid user accounts to verify that the submitted user identifier belongs to a valid account, and/or may attempt to authenticate the user using the submitted credentials. The server-side validation component may generate a validation confirmation or failure message and may forward the message to the client that submitted the original validation request.

A login component 714 may be configured to perform operations associated with logging a user into a messaging application (e.g., setting the user to the active user on the client hosting the messaging application). On the client side, the login component 714 may retrieve the user's login credentials (e.g., through an interface, by retrieving stored credentials for the messaging application, or by requesting the user credentials from another associated application). The login component 714 may also perform other setup operations associated with logging a user into the messaging application (e.g., retrieving and applying the user's preferences, requesting the user's messages from the server, etc.). The login component 714 may generate a login request and transmit the login request to a server. At the server side, the login component 714 may receive the login request and may authenticate user credentials in the login request with the messaging service. The login component 714 may also perform any server-side activities associated with logging a new user in as the active user on the client (e.g., updating the server's log table).

A logout component 716 may be configured to perform operations associated with logging a user out of a messaging application (e.g., setting the user as an inactive user on the client hosting the messaging application). On the client side, the logout component 716 may perform tear-down operations associated with logging a user out of the messaging application (e.g., purging the user's messages from the memory of the device, etc.). The logout component 716 may generate a logout request and transmit the logout request to a server. The logout component 716 may optionally generate an inactive user token and transmit the inactive user token as part of, or alongside, the logout request. At the server side, the logout component 716 may receive the logout request and may perform any server-side activities associated with logging a user out as the active user on the client (e.g., updating the server's log table, recording information from the inactive user token, etc.).

A state restoration component 718 may be configured to restore a messaging application and/or server settings to a previous state. The state restoration component 718 may retrieve the state stored by the state storage component and may restore any relevant settings (e.g., active user, inactive users, preferences, etc.) at the messaging application and/or in any relevant logs or tables maintained by the server.

Figure 7B:
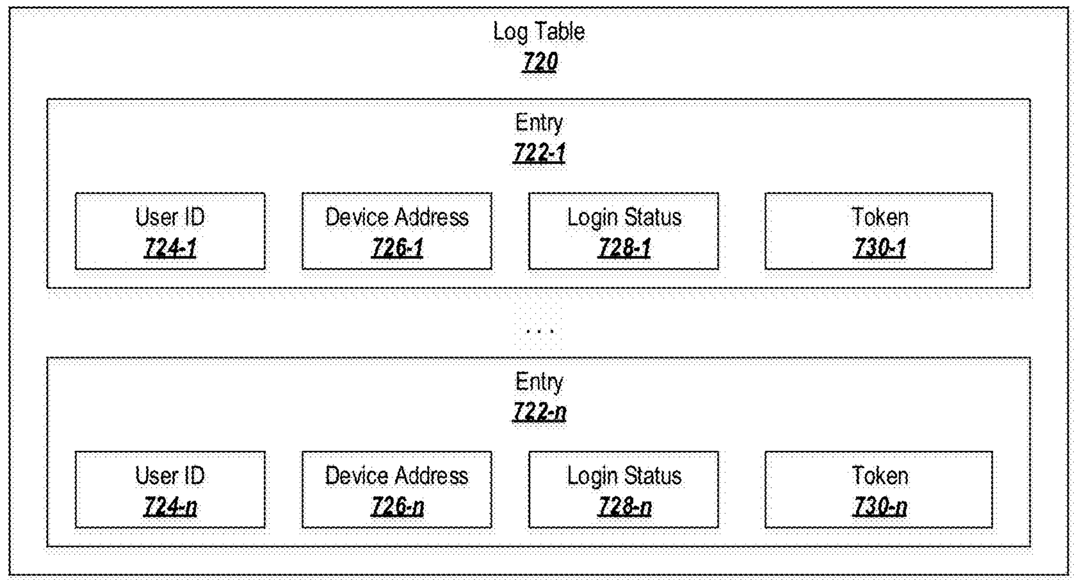
FIG. 7B depicts an exemplary log table maintained by a messaging server on a server device.

FIG. 7B depicts an exemplary log table 720 maintained by a messaging server on a server device. The log table 720 may include one or more entries 722 for each user. The entries 722 may be indexed based on a user identifier 724 of the user, and may store a device address 726 for the device or devices on which the user is registered. If multiple device addresses 726 are associated with the entry 722, then one of the addresses may be flagged as an active address, if the user is actively logged into one device.

The entry 722 may also include a login status 728, which may indicate whether the user is actively logged into the device identified by the device address 726. If multiple devices are associated with the user, then the login status 728 may indicate a status (e.g., active or inactive) on each device.

The entry 722 may also include an inactive user token 730, which may indicate that the user is currently inactive on one or more devices. The inactive user token 730 may identify which devices the user is currently inactive on.

Next, exemplary messaging systems are described in more detail.

Messaging Systems

Figure 8A:
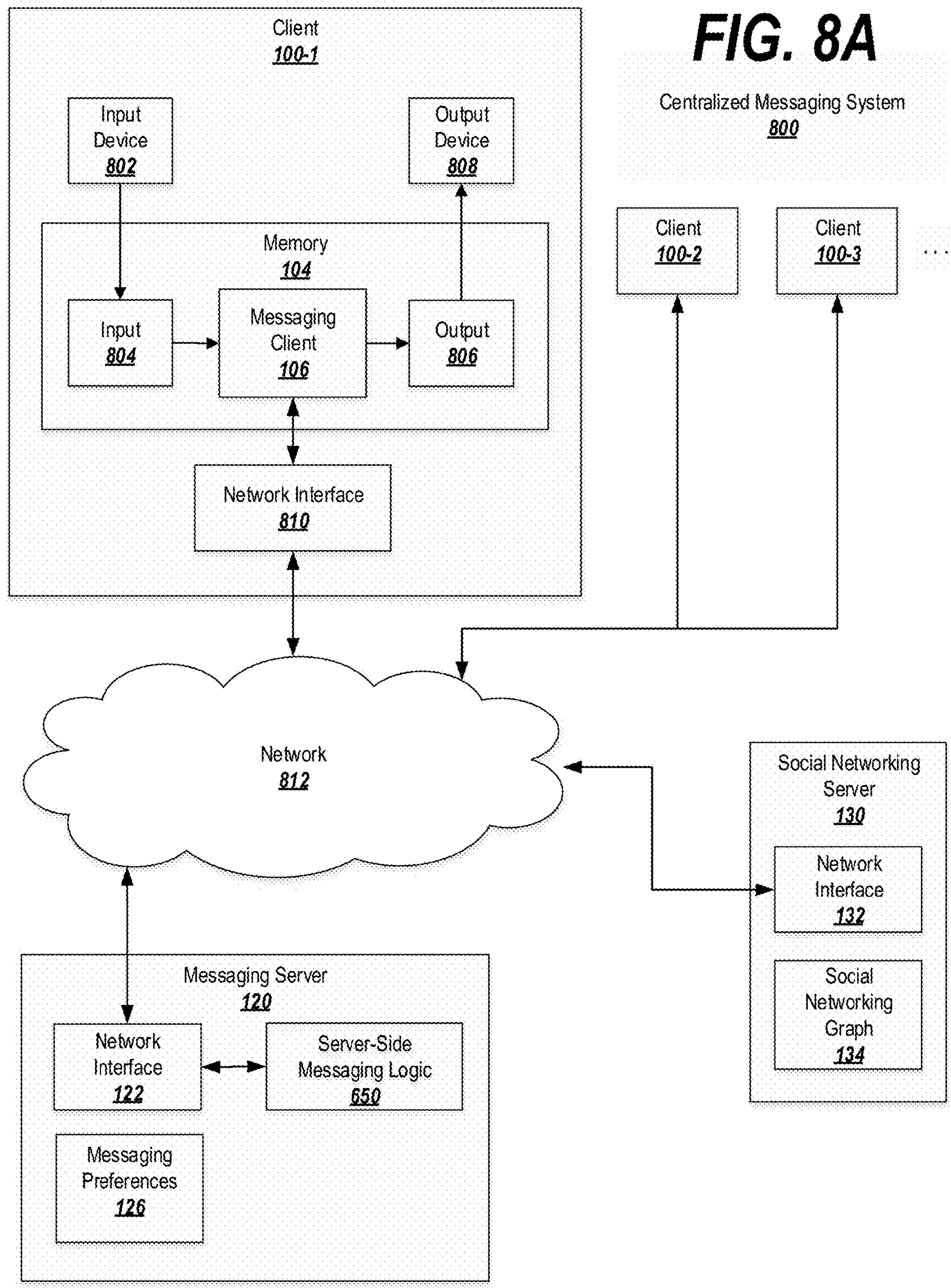
FIG. 8A is a block diagram providing an overview of a system including an exemplary centralized messaging service.

The above-described account switching may be performed by a messaging system. FIG. 8A depicts an exemplary centralized messaging system 800, in which functionality for switching accounts is handled directly by a messaging service. The centralized messaging system 800 may implement some or all of the structure and/or operations of a messaging system in a single computing entity, such as entirely within a single centralized messaging server device 120.

The messaging system 800 may include a computer-implemented system having software applications that include one or more components. Although the messaging system 800 shown in FIG. 8A has a limited number of elements in a certain topology, the messaging system 800 may include more or fewer elements in alternate topologies.

A client device 100 may provide access for a user to a messaging service through a messaging client 106 and a messaging server 120, and/or to a social networking service through a social networking client (not shown) and a social networking server 130. In exemplary embodiments, each of the client devices 100 and their respective messaging clients 106 are associated with a particular user or users of the messaging service. In some embodiments, the client devices 100 may be cellular devices such as smartphones and may be identified to the messaging service based on a phone number associated with each of the client devices 100. In some embodiments, each messaging client 106 may be associated with a plurality of user accounts registered with the messaging service. In general, each messaging client 106 may be addressed through various techniques for the reception of messages.

While in some embodiments the client devices 100 may be cellular devices, in other embodiments one or more of the client devices 100 may be personal computers, tablet devices, any other form of computing device.

The client 100 may include one or more input devices 802 and one or more output devices 808. The input devices 802 may include, for example, microphones, keyboards, cameras, electronic pens, touch screens, and other devices for receiving inputs including message data, requests, commands, user interface interactions, selections, and other types of input. The output devices 808 may include a speaker, a display device such as a monitor or touch screen, and other devices for presenting an interface to the messaging system 800.

The client 100 may include a memory 104, which may be a non-transitory computer readable storage medium, such as one or a combination of a hard drive, solid state drive, flash storage, read only memory, or random access memory. The memory 104 may store a representation of an input 804 and/or a representation of an output 806, as well as one or more applications. For example, the memory 104 may store a messaging client 106 that allows a user to interact with a messaging service and/or a social networking client that allows a user to interact with a social networking service.

The input 804 may be textual, such as in the case where the input device 802 is a keyboard. Alternatively, the input 804 may be an audio recording, such as in the case where the input device 802 is a microphone. Accordingly, the input 804 may be subjected to automatic speech recognition (ASR) logic in order to transform the audio recording to text that is processable by the messaging system 800. The ASR logic may be located at the client device 100 (so that the audio recording is processed locally by the client 100 and corresponding text is transmitted to the messaging server 120), or may be located remotely at the messaging server 120 (in which case, the audio recording may be transmitted to the messaging server 120 and the messaging server 120 may process the audio into text). Other combinations are also possible—for example, if the input device 802 is a touch pad or electronic pen, the input 804 may be in the form of handwriting, which may be subjected to handwriting or optical character recognition analysis logic in order to transform the input 802 into processable text.

The client 100 may be provided with a network interface 810 for communicating with a network 812, such as the Internet. The network interface 810 may transmit the input 804 in a format and/or using a protocol compatible with the network 812 and may receive a corresponding output 806 from the network 812.

The network interface 810 may communicate through the network 812 to a messaging server 120 and/or a social networking server 130.

The messaging server 120 may include a network interface 122 for communicating with the network 812, messaging preferences 126 (see FIG. 1A), and messaging logic 650 (see FIG. 6B).

The social networking server 130 may be create and maintain a social graph 134 and to use the social graph 134 to present information and make recommendations to the client 100. The social-networking server 130 may be a network-addressable computing system hosting an online social network. The social networking server 130 may generate, store, receive, and send social-networking data, such as, for example, user-profile data, concept-profile data, social-graph information, or other suitable data related to the online social network. The social networking server 130 may be accessed by the other components of the network environment either directly or via the network 130.

Returning to the messaging server, the messaging preferences 126 may include one or more privacy settings for one or more users and/or message threads. Furthermore, the messaging preferences 126 may include one or more settings, including default settings, for the logic described herein.

The messaging server 120 may include an authorization server (or other suitable component(s)) that allows users to opt in to or opt out of having their actions logged by the messaging server 120 or shared with other systems (e.g., third-party systems), for example, by setting appropriate privacy settings (e.g., in the social network preferences). A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of messaging server 120 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 134. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 130 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 130 may send a request to the data store for the object. The request may identify the user associated with the request. The requested data object may only be sent to the user (or a client system 100 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 130 or explicit connections of a user to a node, object, entity, brand, or page on social networking server 130. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the logic for switching user accounts (e.g., the server-side messaging logic 650) are incorporated into the messaging server 120. In contrast, FIG. 5B depicts an exemplary distributed messaging system 850, in which functionality for switching user accounts is provided in a distinct computing device (the accessibility server 820) that communicates with the messaging server 120. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Figure 8B:
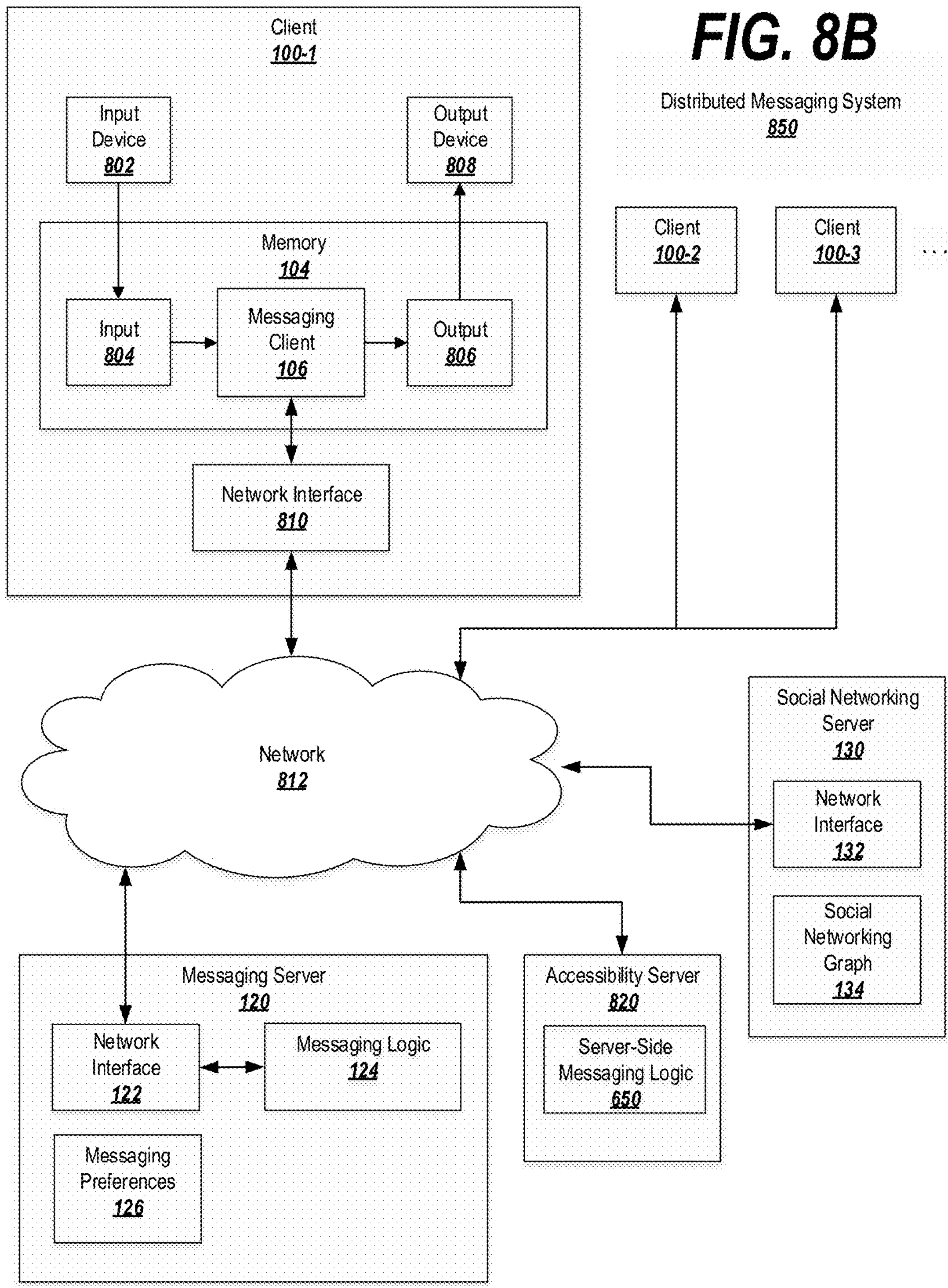
FIG. 8B is a block diagram providing an overview of a system including an exemplary distributed messaging service.

Many of the components depicted in FIG. 8B are identical to those in FIG. 8A, and a description of these elements is not repeated here for the sake of brevity. The primary difference between the centralized embodiment and the distributed embodiment is the addition of a separate accessibility server 820, which hosts the server-side messaging logic 650. The accessibility server 820 may be distinct from the messaging server 120 but may communicate with the messaging server 820, either directly or through the network 812, to provide the functionality of the messaging logic 650 to the messaging server 120.

The embodiment depicted in FIG. 8B may be particularly well suited to allow exemplary embodiments to be deployed alongside existing messaging systems, for example when it is difficult or undesirable to replace an existing messaging server. Additionally, in some cases the messaging server 120 may have limited resources (e.g. processing or memory resources) that limit or preclude the addition of the additional affinity functionality. In such situations, the capabilities described herein may still be provided through the separate accessibility server 820.

Various aspects of the computing infrastructure in which the above-described account switching may be employed are next described with reference to FIGS. 9-12.

Messaging Architecture

Figure 9:
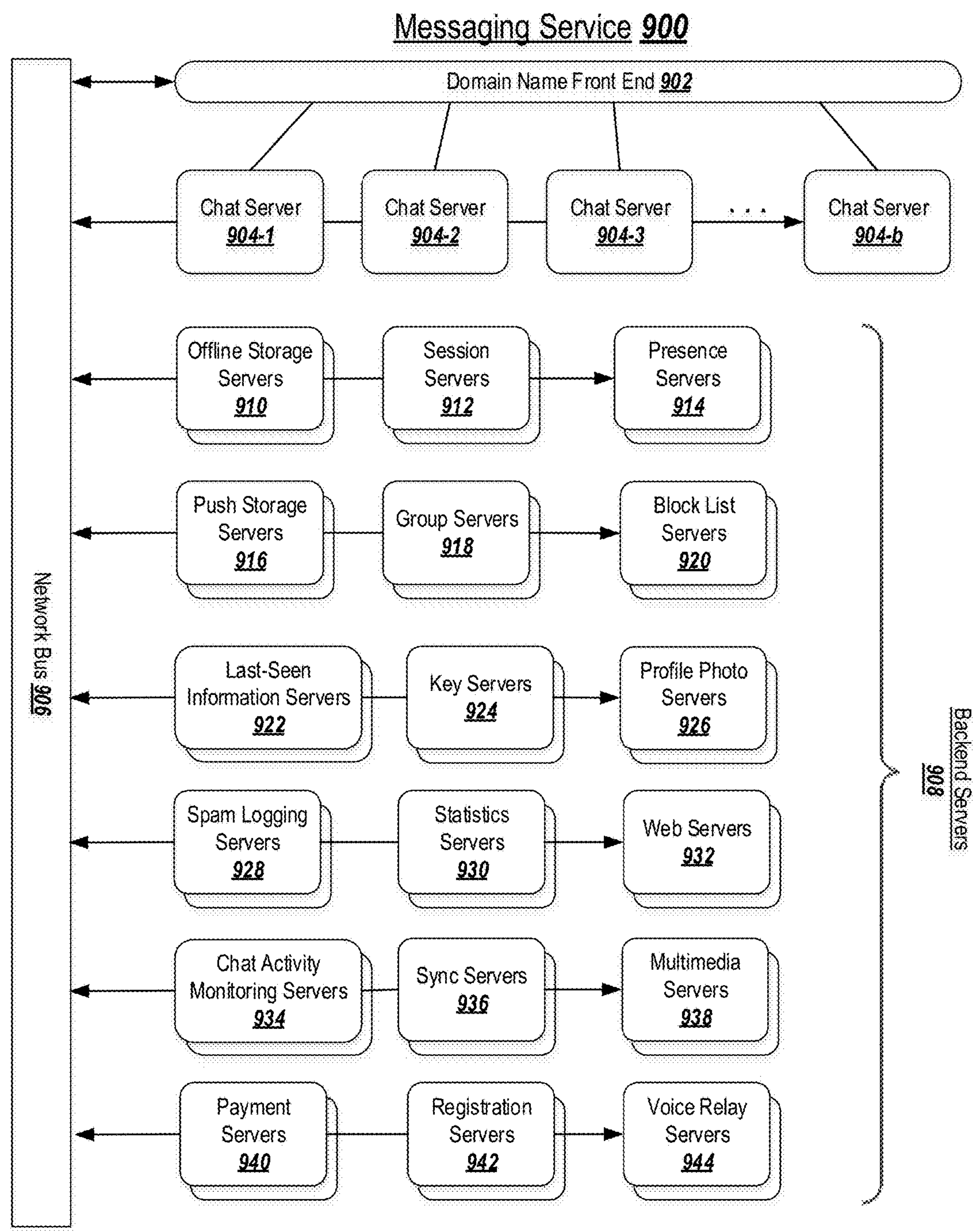
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, and audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Computing Architecture

Figure 10:
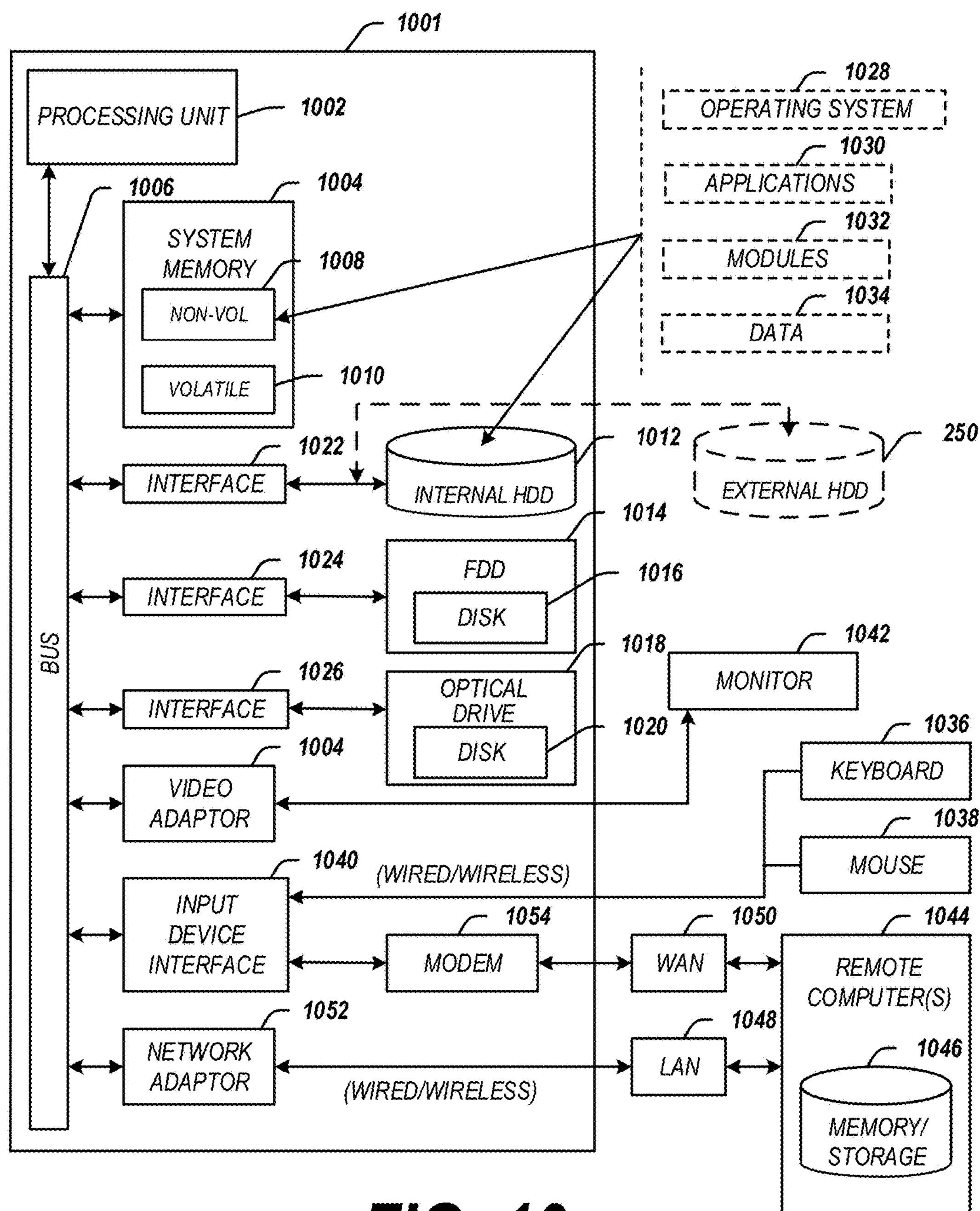
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
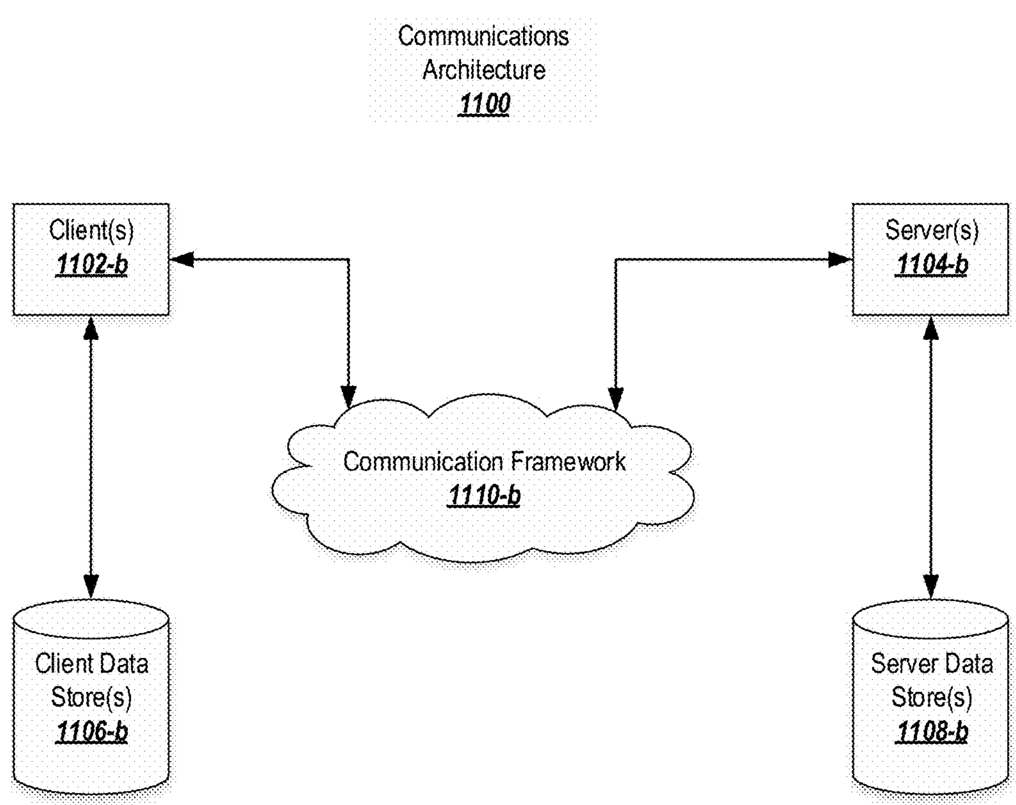
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
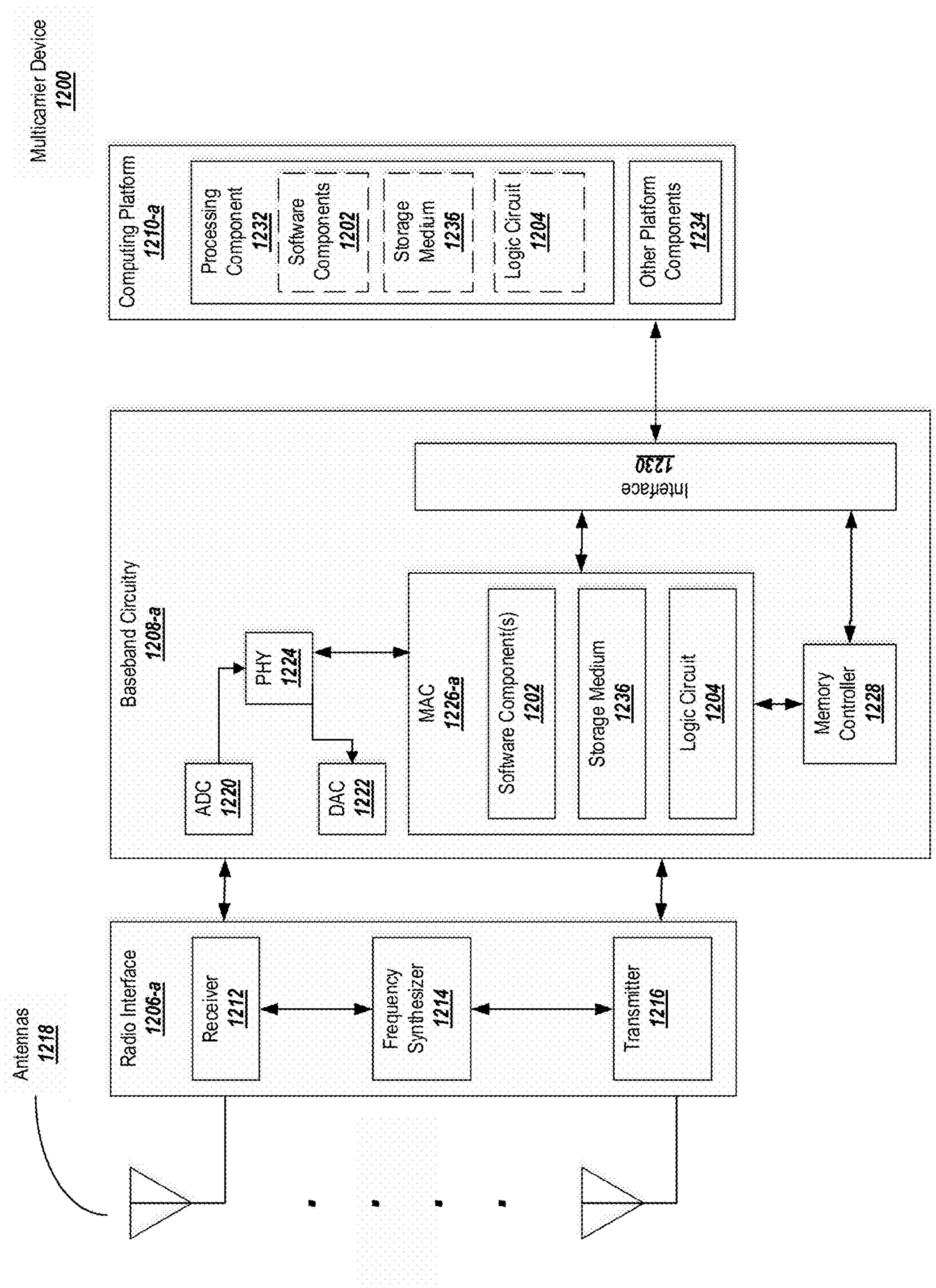
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
- providing messaging services to a first user account logged into a messaging application running on a client device;
- receiving a request at the messaging application to log a second user account into the messaging application;
- performing a log-out operation to log the first user account out of the messaging application in response to the request;
- providing a token for the first user account, the token providing limited access to the messaging services for the first user account while the first user account is logged out of the messaging application;
- performing a log-in operation to log the second user account into the messaging application in response to the request; and
- maintaining reachability of the messaging application by a messaging server associated with the messaging services from a time of the request through a time of completing the log-in operation, the maintaining comprising receiving a notification of a message addressed to the first user account, the message received at a messaging server during a time period between the time of the request and the time of completing the log-in operation.

2. The method of claim 1, the log-out operation and the log-in operation being configured together as an atomic operation, a failure of at least one of the log-out operation or the log-in operation causing a failure of the atomic operation.

3. The method of claim 1, further comprising:
- saving a state of the messaging application prior to performing the log-out operation;
- identifying a failure of at least one of the log-out operation or the log-in operation; and
- reverting to the saved state.

4. The method of claim 1, further comprising validating the second user account with the messaging server prior to performing the log-out operation.

5. The method of claim 1, further comprising providing a notification of a received message addressed to the first user account, the notification lacking content of the message.

6. The method of claim 1, further comprising:
- identifying that the second user account is logged into a social networking application associated with the messaging application on the client device; and
- retrieving account credentials for the second user account from the social networking application.

7. A non-transitory computer-readable medium storing instructions, the instructions comprising instructions to:
- provide messaging services to a first user account logged into a messaging application running on a client device;
- receive a request at the messaging application to log a second user account into the messaging application;
- perform a log-out operation to log the first user account out of the messaging application in response to the request;
- provide a token for the first user account, the token providing limited access to the messaging services for the first user account while the first user account is logged out of the messaging application;
- perform a log-in operation to log the second user account into the messaging application in response to the request; and
- maintain reachability of the messaging application by a messaging server associated with the messaging services from a time of the request through a time of completing the log-in operation, the maintaining comprising receiving a notification of a message addressed to the first user account, the message received at a messaging server during a time period between the time of the request and the time of completing the log-in operation.

8. The non-transitory medium of claim 7, the log-out operation and the log-in operation being configured together as an atomic operation, a failure of at least one of the log-out operation or the log-in operation causing a failure of the atomic operation.

9. The non-transitory medium of claim 7, further storing instructions to:
- save a state of the messaging application prior to performing the log-out operation;
- identify a failure of at least one of the log-out operation or the log-in operation; and
- revert to the saved state.

10. The non-transitory medium of claim 7, further storing instructions for validating the second user account with the messaging server prior to performing the log-out operation.

11. The non-transitory medium of claim 7, further storing instructions for providing a notification of a received message addressed to the first user account, the notification lacking content of the message.

12. The non-transitory medium of claim 7, further storing instructions for:
- identifying that the second user account is logged into a social networking application associated with the messaging application on the client device; and retrieving account credentials for the second user account from the social networking application.

13. A system comprising:

a memory configured to support a messaging application running on a client device;

a messaging component configured to provide messaging services to a first user account logged into the messaging application;

a logout component configured to perform a log-out operation to log the first user account out of the messaging application in response to the request, and to provide a token for the first user account, the token providing limited access to the messaging services for the first user account while the first user account is logged out of the messaging application;

a login component configured to perform a log-in operation to log the second user account into the messaging application in response to the request; and messaging logic configured to maintain reachability of the messaging application by a messaging server associated with the messaging services from a time of the request through a time of completing the log-in operation, the maintaining comprising receiving a notification of a message addressed to the first user account, the message received at a messaging server during a time period between the time of the request and the time of completing the log-in operation.

14. The system of claim 13, the log-out operation and the log-in operation being configured together as an atomic operation, a failure of at least one of the log-out operation or the log-in operation causing a failure of the atomic operation.

15. The system of claim 13, further comprising:

a state storage component configured to save a state of the messaging application prior to performing the log-out operation; and a state restoration component configured to, in response to identifying a failure of at least one of the log-out operation or the log-in operation, revert to the saved state.

16. The system of claim 13, further comprising a validation component configured to validate the second user account with the messaging server prior to performing the log-out operation.

17. The system of claim 13, further comprising a notification component configured to provide a notification of a received message addressed to the first user account, the notification lacking content of the message.

* * * * *